US009422678B1

(12) United States Patent
Baaske et al.

(10) Patent No.: US 9,422,678 B1
(45) Date of Patent: Aug. 23, 2016

(54) CUTTING ATTACHMENT APPARATUS AND METHOD

(71) Applicants: John A. Baaske, Dyer, IN (US); Stacy L. Deming, Dyer, IN (US); Marc W. Pentecost, Valparaiso, IN (US)

(72) Inventors: John A. Baaske, Dyer, IN (US); Stacy L. Deming, Dyer, IN (US); Marc W. Pentecost, Valparaiso, IN (US)

(73) Assignee: JS INNOVATIONS, LLC, Schererville, IN (US)

(*) Notice: Subject to any disclaimer, the term of this patent is extended or adjusted under 35 U.S.C. 154(b) by 0 days.

(21) Appl. No.: 14/120,074

(22) Filed: Apr. 23, 2014

(51) Int. Cl.
*E01C 23/09* (2006.01)
*B28D 1/04* (2006.01)
*B23D 45/02* (2006.01)

(52) U.S. Cl.
CPC .............. *E01C 23/094* (2013.01); *E01C 23/09* (2013.01); *B23D 45/024* (2013.01); *B28D 1/045* (2013.01)

(58) Field of Classification Search
CPC . E01C 23/094; E01C 23/0933; E01C 23/092; E01C 23/088; E01C 23/0885; E01C 19/004; E01C 23/0946; B28D 1/02; B28D 1/04; B28D 1/044; B28D 1/045; B28D 1/047; B28D 1/066; B28D 7/005; B28D 1/042; B23D 47/12; B23D 45/027; B23D 45/024
See application file for complete search history.

(56) References Cited

U.S. PATENT DOCUMENTS

| 4,357,120 | A | * | 11/1982 | MacDonald | E01C 23/094 144/34.1 |
|---|---|---|---|---|---|
| 5,123,462 | A | * | 6/1992 | Davision | A01G 23/093 144/336 |
| 5,676,125 | A | * | 10/1997 | Kelly | B28D 1/045 125/13.03 |
| 6,863,062 | B2 | * | 3/2005 | Denys | B23D 45/027 125/13.01 |
| 7,150,300 | B1 | * | 12/2006 | Peterson | A01G 23/067 144/24.12 |
| 2002/0024249 | A1 | * | 2/2002 | Bertrand | E01C 23/0933 299/39.3 |
| 2002/0195094 | A1 | * | 12/2002 | Crawford | B23D 45/024 125/13.01 |
| 2006/0127179 | A1 | * | 6/2006 | Nadler | E01C 11/14 404/47 |
| 2010/0131157 | A1 | * | 5/2010 | Kahle | E02F 9/2267 701/50 |
| 2011/0084540 | A1 | * | 4/2011 | Cochran | E01C 23/094 299/18 |

OTHER PUBLICATIONS

Equipment Synergy International, "Curbie Professional Curb Cutting", ESI product brochure, at least as early as Feb. 2014, pp. 1-2, USA.
CESSCO, CESSCO CC8000 Rider Concrete Saw, Internet Web Page screen shot at http://www.cessco.us/concrete_saws-cc8000.html, at least as early as Feb. 2014, pp. 1-2, USA.
Steel Fusion Concrete Cutting Solutions, Steel Fusion Curb Saw, Internet Web Page screen shot at http://steelfusionequipment.com/product2.html, at least as early as Feb. 2014, pp. 1-3, USA.
Reimann & Georger Corp., Circular Saws—Hydraulic Saws, Internet Web Page screen shot at http://www.rgcproducts.com/construction/hydrasaws.html, p. 1, USA.

* cited by examiner

*Primary Examiner* — John Kreck
*Assistant Examiner* — Carib Oquendo
(74) *Attorney, Agent, or Firm* — Paul Barenie, Esq.

(57) ABSTRACT

A cutting attachment apparatus and method comprise an attachment frame, and a host machine interface coupled with the attachment frame for coupling the attachment with a host machine. A cutting assembly is coupled with the attachment frame. A cut insertion depth assembly is coupled with the attachment frame and the cutting assembly for altering the insertion depth of a cut of the cutting assembly, and a cut angle assembly is coupled with the attachment frame and the cutting assembly for altering an angle of the cut of the cutting assembly.

20 Claims, 27 Drawing Sheets

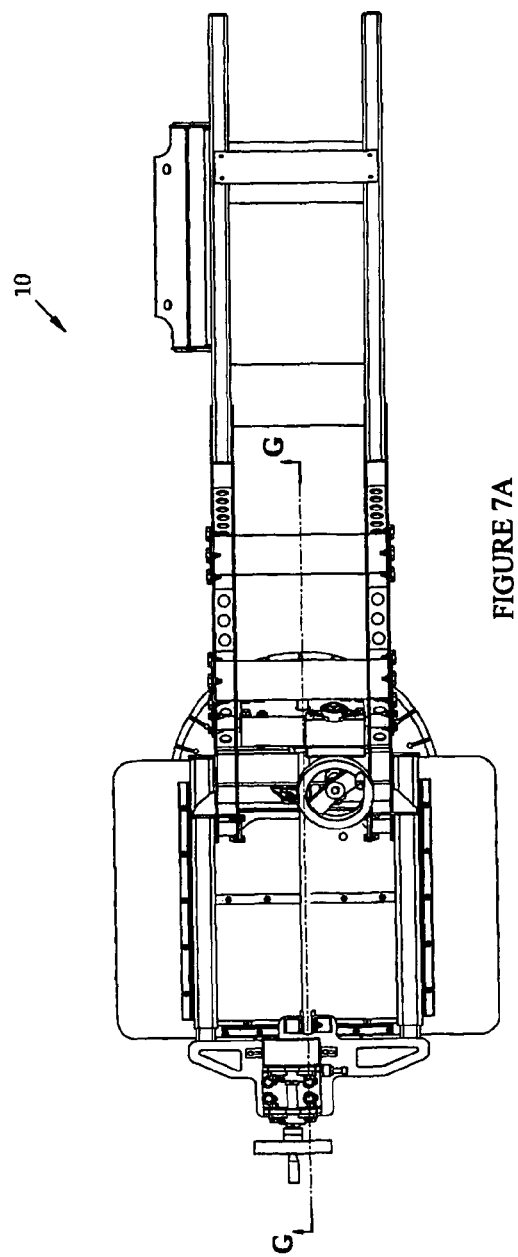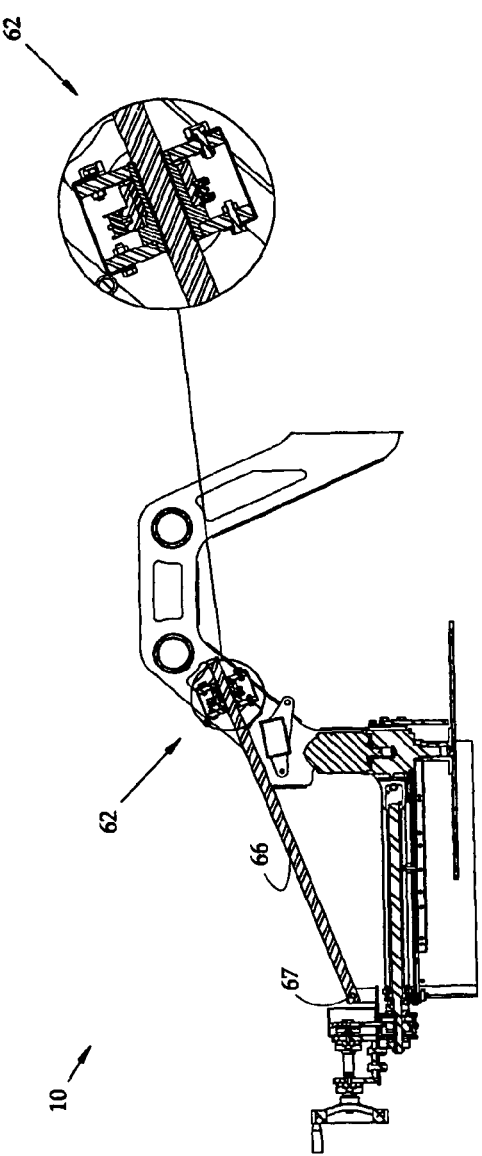
FIGURE 7A
FIGURE 7B

CUTTING ATTACHMENT APPARATUS AND METHOD

TECHNICAL FIELD

This disclosure is directed to cutting, and more particularly, to an attachment for performing cuts to objects and materials.

BACKGROUND ART

There are stand alone vehicles that are used to perform cuts to materials and objects, for example, concrete, concrete curbs and concrete driveway aprons. Such machines are heavy and utilize a large, fixed frame design, that in some situations render it difficult to perform various cuts to existing concrete structures, including curbing, driveway aprons, pilings, piers, stanchions, walls, and foundations. For example, where existing stand alone vehicles are used on uneven surfaces, or surfaces composed of soft materials such as gravel, sand, grass or dirt, such large and heavy machines are often unable to manage the terrain. Such surfaces slow the operation capabilities of such machines, and impact the precision and accuracy of the cuts made. Often, a second cutting pass is required to clean up the imprecision and inaccuracies before any finishing step, such as grinding, can be accomplished.

It is necessary for existing stand alone vehicles perform their cuts, for example, to existing curbs, with their cutting blade on the street-side of the curb. However, performing a cut to an existing curb in this manner risks damaging the street during the cut, especially where anything besides a horizontal cut is made. Further, where the backside of a curb is adjacent another structure, for example, a concrete driveway apron, existing stand alone vehicles have significant risk of damaging the apron while cutting the existing curb. Further, plunge cuts with stand-alone cutting vehicles are difficult or impossible to accomplish, as are cuts on curbs having a tight turning radius.

Additionally, the stand alone vehicles are limited in their ability to perform cuts at heights above their existing support frame and/or their designed intent. Yet, should their frame size be increased to increase cutting height capabilities, transport of the larger stand-alone machine would be rendered even more difficult and impractical.

With existing stand alone vehicles, it is difficult or impossible to perform cuts across concrete structures such as concrete walls. Even if it is possible for these large, stand alone vehicles to perform such cuts, the large stand alone vehicle footprint prevents access to the structure, for example, because of other nearby structures or objects. In addition, where cutting or other operations are desired on top of an existing structure, for example, a building roof, the size and weight of existing stand-alone cutting vehicles exceed the allowable operating live load capabilities of the structure. The top of a structure may also have limited available area for a machine to operate. In such cases, existing stand alone vehicles cannot be employed safely, or cannot be employed at all, to operate on such structures. Further, where it is desired to make cuts within an existing structure that has limited entry capabilities, for example, a double entry door, the large size of existing stand alone vehicles prevent such cuts to be made.

The size and weight of existing stand alone vehicles makes transport of these machines to job sites difficult, and such transport often encounters difficulties with rural road conditions and Department Of Transportation (DOT) size and weight restrictions.

In addition, where cuts are desired beneath water, existing stand alone vehicles are unable to navigate the terrain adjacent the water, or the water itself, and are thus unable to perform such cuts.

This invention is directed to overcoming one or more of the problems discussed above.

SUMMARY OF THE INVENTION

A cutting attachment apparatus and method comprise an attachment frame, and a host machine interface coupled with the attachment frame for coupling the attachment with a host machine. A cutting assembly is coupled with the attachment frame. A cut insertion depth assembly is coupled with the attachment frame and the cutting assembly for altering the insertion depth of a cut of the cutting assembly, and a cut angle assembly is coupled with the attachment frame and the cutting assembly for altering an angle of the cut of the cutting assembly.

In one embodiment, the attachment frame includes an A-frame portion, and where the cutting assembly being coupled with the attachment frame includes the cutting assembly being coupled with the attachment frame proximate the A-frame portion, allowing for the cutting assembly to accomplish a cut within a perimeter of the attachment frame.

In a further embodiment, the attachment frame includes at least one fixed rail proximate the A-frame portion, and the cutting assembly portion includes at least one corresponding receiving channel for interfacing with the fixed rail. The cut insertion depth assembly alters the insertion depth of a cut by moving the cutting assembly receiving channel along the fixed rail.

In a further embodiment, the cutting apparatus being coupled with the attachment frame includes the cutting apparatus being pivotally coupled with the attachment frame, and the cut angle assembly being coupled with the attachment frame includes the cut angle assembly being pivotally coupled with the attachment frame. The cut angle assembly includes a rotatable female threaded coupling, and a threaded cut angle rod coupled within the female threaded coupling, the cut angle rod further coupled at a coupling point of the cutting assembly. The actuating of the cut angle assembly alters the angle of the cut by rotating the female threaded coupling to pivot the cutting assembly.

In yet another embodiment, the cutting assembly includes a cutting assembly hydraulic motor, and a hydraulic manifold is coupled with the attachment frame, having a host hydraulic port set for receiving and sending pressurized hydraulic fluid between the hydraulic manifold and a host machine, and a cutting assembly hydraulic port set for sending and receiving pressurized hydraulic fluid between the manifold and the cutting assembly hydraulic motor. The cutting assembly hydraulic motor is coupled with the cutting assembly hydraulic port set. In a further embodiment, a two position directional valve is coupled between the host hydraulic port set and the cutting assembly port set, for controlling hydraulic fluid flow to the cutting assembly hydraulic motor.

In a further embodiment yet, the a cut insertion depth assembly includes a reversible cut depth hydraulic motor for altering the insertion depth of a cut of the cutting assembly, and the manifold including a cut depth hydraulic port set is coupled with the reversible cut depth hydraulic motor. A three position directional valve is included between the host hydraulic port set and the cut depth hydraulic port set, and having first, second and third positions, where actuating the three position valve to the second position drives the reversible cut depth hydraulic motor in a first direction to increases insertion depth of the cut, and actuating the three position valve to the third position drives the reversible cut depth hydraulic motor in a second direction to decreases insertion depth of the cut. In a further embodiment, the cut insertion depth assembly includes a reversible cut angle hydraulic motor for altering the angle of a cut of the cutting assembly, and the manifold includes a cut angle hydraulic port set coupled with the reversible cut angle hydraulic motor. A three position directional valve is coupled between the host hydraulic port set and the cut angle hydraulic port set, and having first, second and third positions, where actuating the three position valve to the second position drives the reversible cut angle hydraulic motor in a first direction to increases an angle of the cut, and actuating the three position valve to the third position drives the reversible cut angle hydraulic motor in a second direction to decreases the cut angle of the cut.

In another embodiment, the cutting attachment apparatus extends over the object, where the object has a proximate side adjacent the host machine interface and a distant side away from the host machine interface, and where the cutting assembly coupled with the attachment frame for providing a cut to an object includes the cutting assembly extending past the distant side of the object for providing a cut to the distant side of the object.

BRIEF DESCRIPTION OF SEVERAL VIEWS OF THE DRAWINGS

FIG. 7A is a plan view of the cutting attachment apparatus 10 of FIG. 1 in accordance with an embodiment of the invention;

FIG. 7B is a is sectional view along lines G-G of the cutting attachment apparatus of FIG. 7A in accordance with an embodiment of the invention;

DETAILED DESCRIPTION OF THE PREFERRED EMBODIMENT

A cutting attachment apparatus and method comprise an attachment frame, and a host machine interface coupled with the attachment frame for coupling the attachment with a host machine. A cutting assembly is coupled with the attachment frame. A cut insertion depth assembly is coupled with the attachment frame and the cutting assembly for altering the insertion depth of a cut of the cutting assembly, and a cut angle assembly is coupled with the attachment frame and the cutting assembly for altering an angle of the cut of the cutting assembly. In a further embodiment, the attachment frame includes an A-frame portion, and where the cutting assembly being coupled with the attachment frame includes the cutting assembly being coupled with the attachment frame proximate the A-frame portion, allowing for the cutting assembly to accomplish a cut within a perimeter of the attachment frame. In another embodiment, the cutting attachment apparatus extends over the object, where the object has a proximate side adjacent the host machine interface and a distant side away from the host machine interface, and where the cutting assembly coupled with the attachment frame for providing a cut to an object includes the cutting assembly extending past the distant side of the object for providing a cut to the distant side of the object.

For simplicity purposes, various hydraulic connections, for example, between a host machine and the cutting attachment apparatus, and/or between a manifold discussed with respect to various embodiments and hydraulic motor(s) used on the cutting attachment apparatus, are left off of the drawings of FIGS. 1-22 below.

Figure 1:
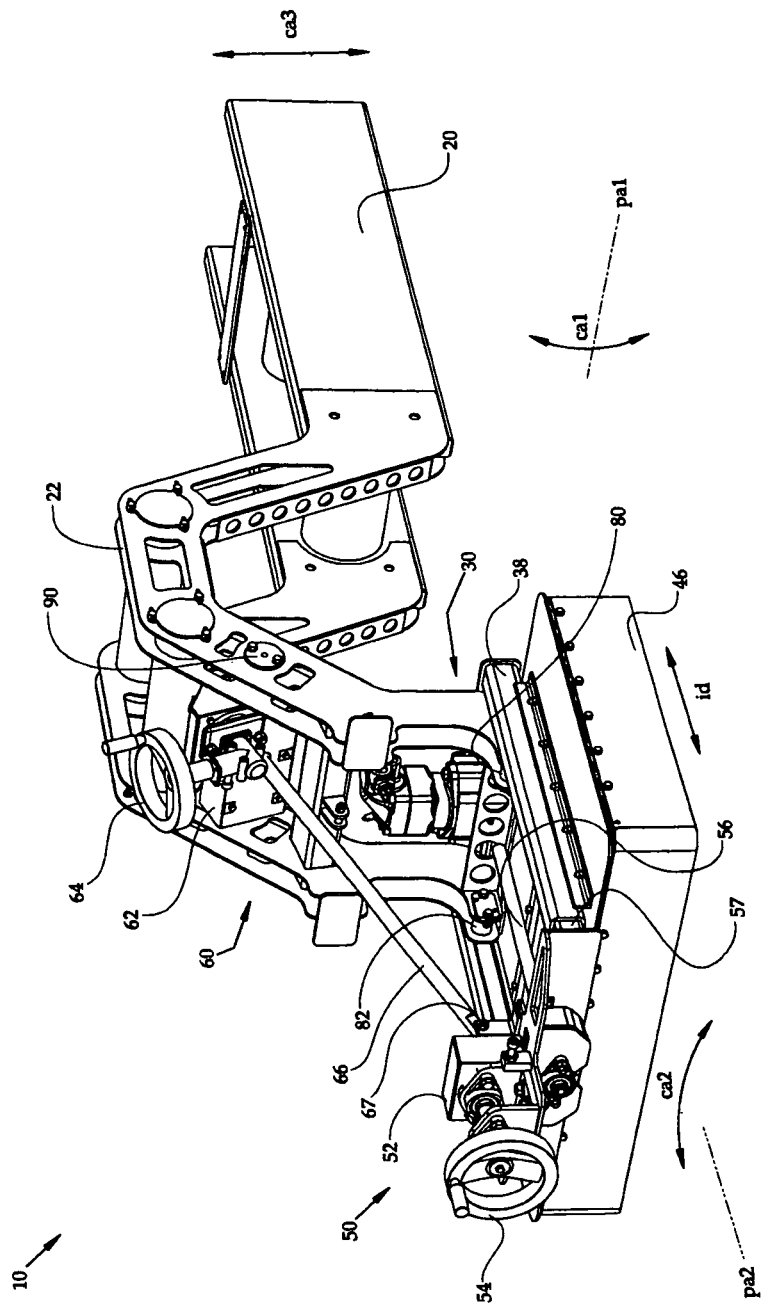
FIG. 1 is a perspective view of a cutting attachment apparatus in accordance with an embodiment of the invention.
Figure 2:
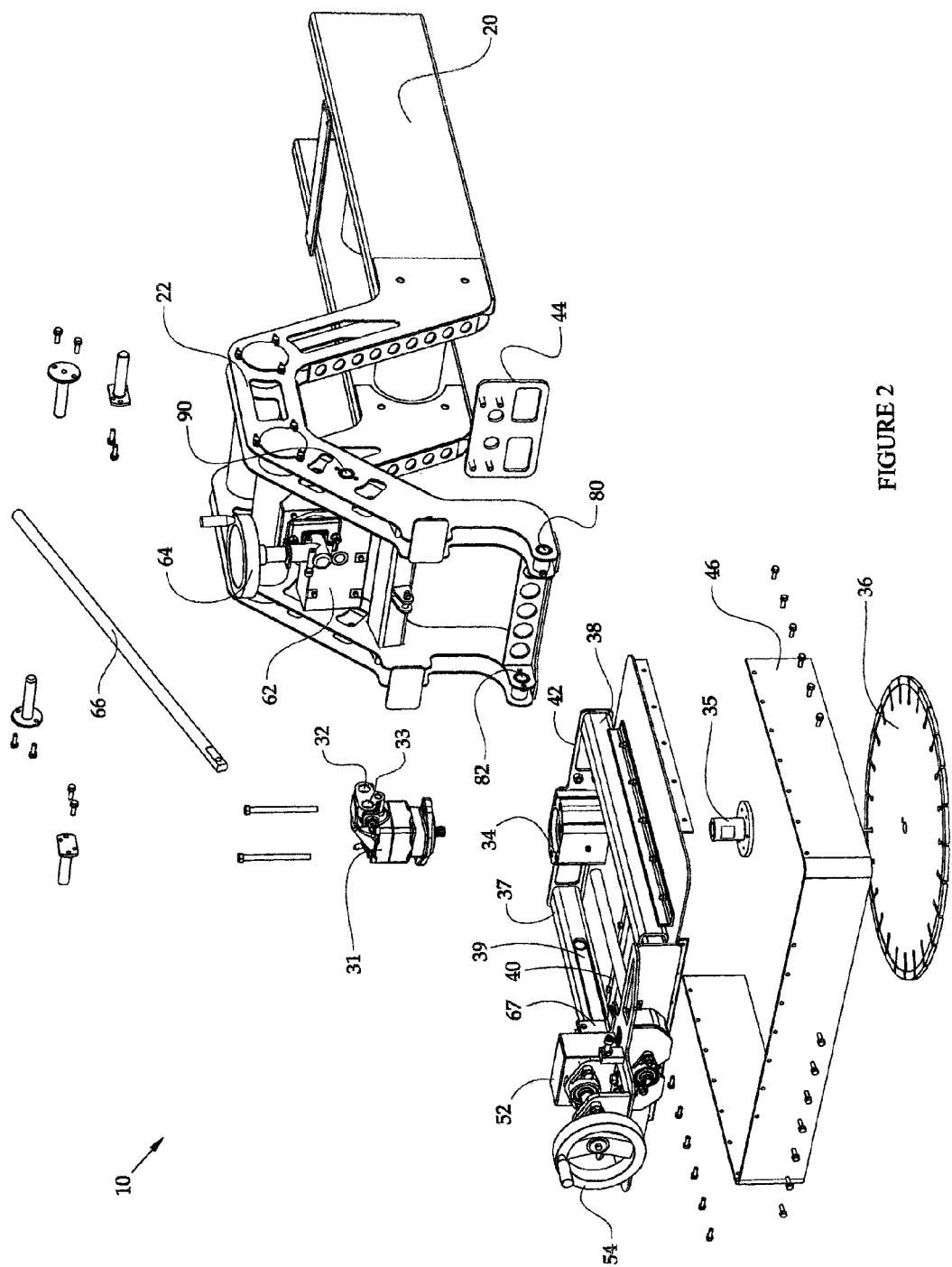
FIG. 2 is a partially exploded view of the cutting attachment apparatus 10 of FIG. 1 in accordance with an embodiment of the invention.
Figure 3:
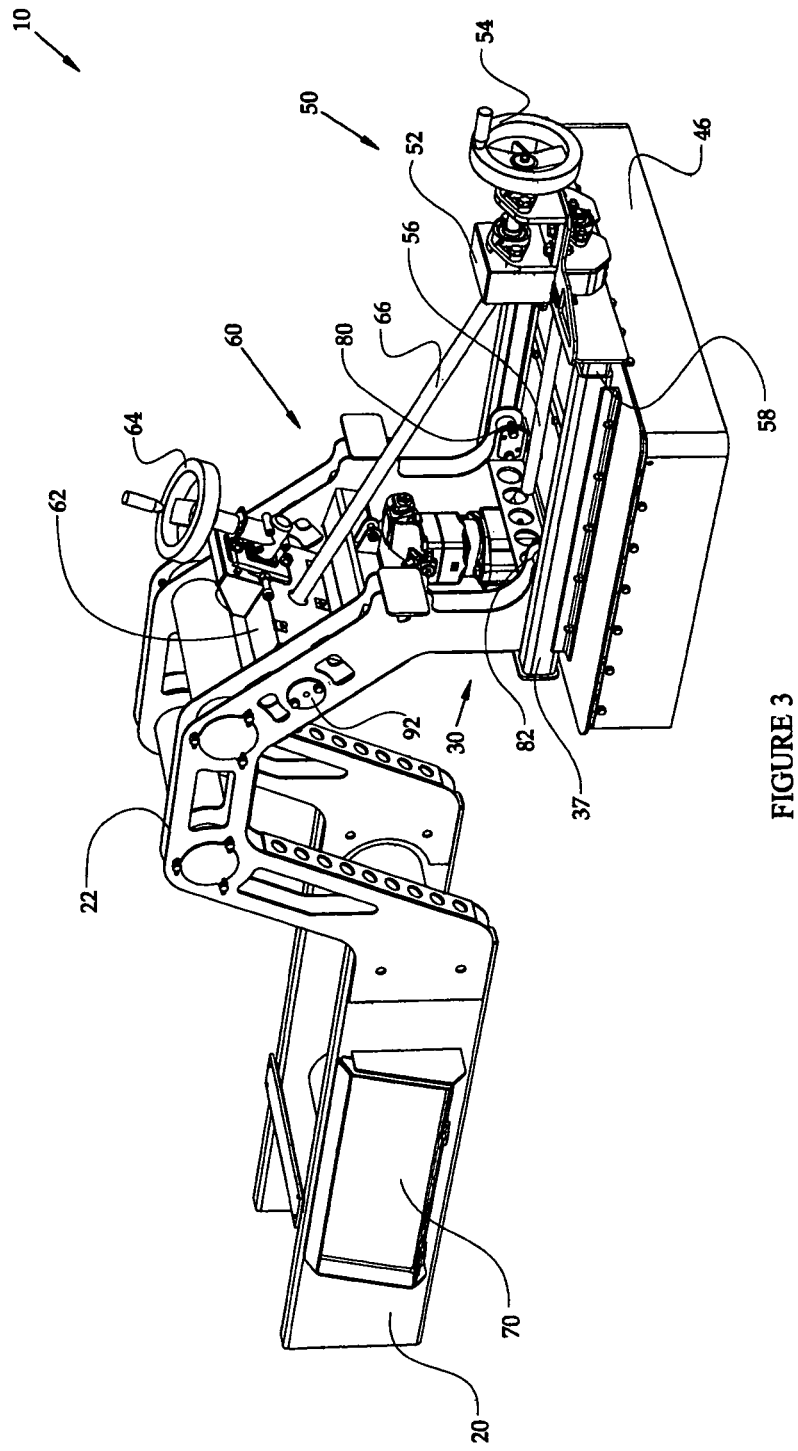
FIG. 3 is a rear perspective view of a cutting attachment apparatus 10 of FIG. 1, in accordance with an embodiment of the invention.

FIG. 1 is a perspective view of a cutting attachment apparatus in accordance with an embodiment of the invention. FIG. 2 is a partially exploded view of the cutting attachment apparatus of FIG. 1 in accordance with an embodiment of the invention. FIG. 3 is a rear perspective view of a cutting attachment apparatus of FIG. 1, in accordance with an embodiment of the invention.

Referring to FIGS. 1-3, a cutting attachment 10 includes an attachment frame 20 and a cutting assembly shown generally at 30 coupled with the frame 20. A cut insertion depth assembly shown generally at 50 is shown coupled with the frame 20 and the cutting assembly 30, and may allow for altering the insertion depth of a cut. A cut angle assembly shown generally at 60 is shown coupled with the frame 20 and the cutting assembly 30, and may allow for altering an angle of the cut. Further shown is a host machine interface 70 for coupling the cutting attachment 10 with a host machine (not shown).

The frame 20 may include an A-frame portion shown generally at 22. As shown, the cutting assembly 30 may be coupled with the frame 20 proximate to the A-frame portion 22.

The cutting assembly 30 includes a motor, for example, a cutting assembly hydraulic motor 31 having supply port 32 and return port 33. The cutting assembly hydraulic motor 31 is coupled with an overhung load adapter 34 that is further coupled with a cutting element adapter 35. The cutting element adapter 35 is further coupled with a cutting element shown at 36.

Here, the cutting element is a blade, for example, an aggregate blade capable of cutting stone, concrete, brick and the like. Other cutting elements may be employed. Where the cutting element is a blade 36, the cutting element adapter 35 may be a blade adapter. The cutting assembly 30 further includes at least one receiving rail, for example the receiving rails 37, 38. As shown, the receiving rails 37, 38 are coupled to one another via cross members, for example cross members 40, 42. The overhung load adapter 34 may be coupled with cross member 42 of the cutting assembly 30. A protection plate 44 is coupled with cross member 42 and may be utilized to protect the cutting element adapter 35 from over-engaging the cutting assembly 30. The protection plate 44 coupling to cross member 42 may be independent of the overhung load adapter coupling to cross member 42. Actuation of the cutting assembly hydraulic motor 31 transfers rotation of a shaft of the motor, through the overhung load adapter 34, to the blade adapter 35 and thus to the blade 36.

The cutting assembly 30 may include guard 46, here a blade guard 46, to protect against contact with the cutting element, here the blade 36, while the cutting attachment 10 is in operation. Guard 46 may further help shield against dust, debris, and loose aggregate that may be projected or otherwise stirred up by the cutting element 36 while the cutting attachment 10 is in operation.

The cut insertion depth assembly shown generally at 50 may include a cut insertion depth actuator 54 coupled with a cut insertion depth coupler 52. The cut insertion depth coupler 52 may be coupled with the frame 20, for example at the A-frame portion 22, and further coupled with a cut depth rod 56. The cut depth rod 56 may be a threaded rod (threading not shown) that couples with a mating threaded coupler nut of the cutting assembly frame (not shown). As will be discussed in more detail below with respect to FIGS. 5 and 6, actuation of the cut insertion depth assembly 54 causes the cut depth rod 56 to rotate, thereby pushing or pulling against the threaded coupler nut of the cutting assembly frame. In this way, the cutting assembly 30 and corresponding cutting element (here blade 36) moves in the direction generally indicated at 'id' of FIG. 1, for example, to be inserted in or retracted from the object being cut by the cutting attachment apparatus 10.

As will be described in more detail below, at least one fixed rail, for example fixed rails 57 and 58, are coupled with the frame 20, for example, proximate the A-frame portion 22. Here, the fixed rails are shown pivotally coupled with the frame 20 at pivot points 80, 82. Receiving rails 37, 38 may include channels, for example, channel 39, allowing the cutting assembly 30 to be moved along the fixed rails 57, 58 through pivot pins of pivot points 80, 82.

The cut angle assembly shown generally at 60 may include a cut angle actuator 64, here shown as a cut angle crank handle 64. A cut angle coupler 62 is coupled with the crank handle 64, and with the frame 20, for example proximate the A-frame portion 22. As shown, the cut angle coupler 62 is pivotally coupled with the frame 20, for example, proximate the A-frame portion 22, at pivot points 90, 92. The cut angle coupler 62 may further be coupled with a cut angle rod 66, which may be coupled with the cutting assembly through a coupling point shown at 67. Actuation of the crank handle 64, through the cut angle coupler 62, causes the cut angle rod 66 to be drawn through or extended from the cut angle coupler 62, thereby increasing or decreasing an angle of cut of the cutting assembly 30. The pivot points 80, 82 and 90, 92 allow the cutting assembly 30 and the cut angle coupler 62 to pivot to accommodate the angle adjustment, and allowing the cut angle rod 66 to remain true and properly oriented as it is drawn through or extended from the cut angle coupler 62.

As shown in FIG. 1, a pivot axis 'pa1' is shown, parallel with a pivot axis formed at the pivot points 80, 82. Such angle adjustment may thus allow the cutting assembly 30 and corresponding cutting element 36 to be adjusted about the pivot axis 'pa1' in the direction 'ca1' shown in FIG. 1. Operation of the cut angle assembly 60 will be discussed in more detail below with respect to FIGS. 7-9.

Pivot axis 'pa2' is shown, perpendicular with the pivot axis 'pa1.' As will be described in more detail below, where it is desired to adjust an angle of the cutting assembly 30 about the 'pa2' pivot axis in the 'ca2' direction shown in FIG. 1, a 'curl-up' or 'curl-down' movement of the host machine may be utilized. Further, as will be appreciated, raising or lowering the cutting attachment apparatus 10 in the 'ca3' direction shown in FIG. 1 may be accomplish through a host machine (not shown), for example, as a 'boom-up' or boom-down' movement in the same manner as would be utilized to raise or lower a bucket or fork assembly of the host machine.

Figure 4A:
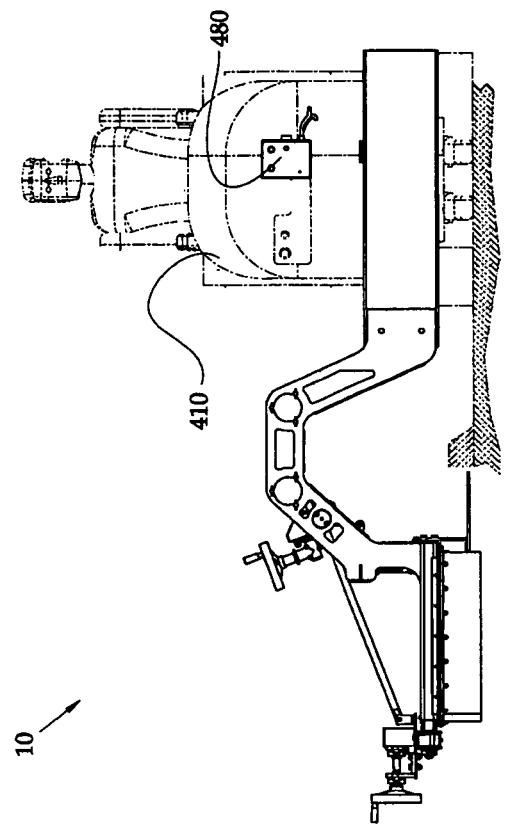
FIG. 4A is a side elevation view of the cutting attachment apparatus 10 of FIG. 1 attached with a host machine, in accordance with an embodiment of the invention.
Figure 4B:
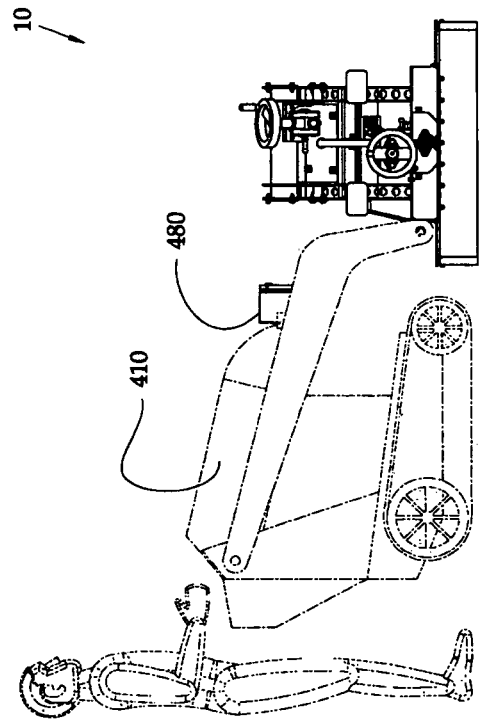
FIG. 4B is a front elevation view of the cutting attachment apparatus of FIG. 1 attached with a host machine, in accordance with an embodiment of the Invention.
Figure 4C:
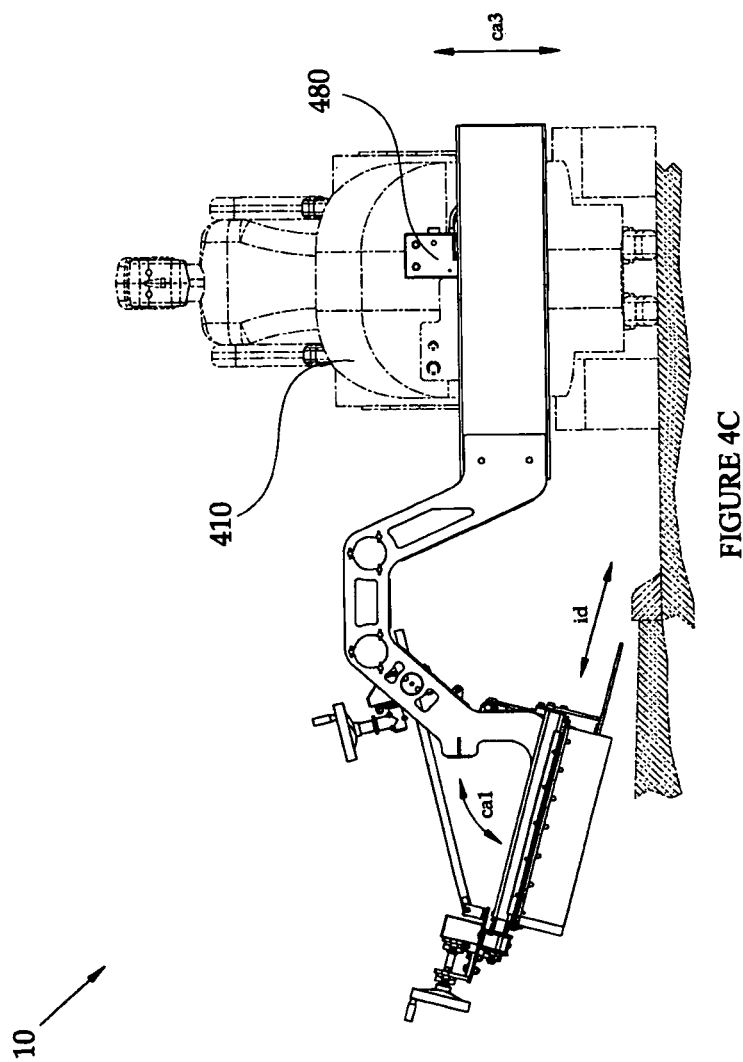
FIG. 4C is a side elevation view of the cutting attachment apparatus 10 of FIG. 1 attached with a host machine, in accordance with an embodiment of the invention.

FIG. 4A is a side elevation view of the cutting attachment apparatus 10 of FIG. 1, attached with a host machine and oriented for cutting a curb, in accordance with an embodiment of the invention. FIG. 4B is a front elevation of the cutting attachment apparatus of FIG. 1, attached with a host machine, in accordance with an embodiment of the Invention. FIG. 4C is a side elevation view of the cutting attachment apparatus 10 of FIG. 1, attached with a host machine, and oriented for cutting a curb adjacent a driveway apron, in accordance with an embodiment of the invention;

As shown in FIGS. 4A-4C, a host machine 410 may be coupled with the cutting attachment apparatus 10, using the host machine interface 70 (shown in FIG. 3). As will be appreciated by one skilled in the art, such an interface may include one or more bolts (not shown) securing the cutting attachment apparatus 10 with the host machine 410, or in the alternative may include spring-loaded pins (not shown), allowing for quick attachment or detachment of the cutting attachment apparatus 10 with the host machine 410. Further shown in FIGS. 4A-4C is a junction box 480. Such a junction box 480 may be utilized in an embodiment of a cutting apparatus where remote operation of, for example, adjustments to blade insertion depth and/or cut angle is desired. Thus, in some embodiments, the junction box 480 is not necessary and thus need not be included. The junction box 480 will be described further below with respect to FIGS. 21-24, in accordance with embodiments of the invention. As will be appreciated, where utilized, the junction box 480 may be a permanent fixture of a host machine, i.e., added to a host machine often used with the cutting attachment apparatus, or may be temporarily attached with the host machine.

Further shown in FIG. 4A, the cutting attachment apparatus may extend over the object being cut, allowing cuts to the object to be made within a perimeter (or footprint) of the attachment frame 20 of the cutting attachment apparatus. For example, as shown in FIG. 4A, the cutting attachment apparatus may extend over the object being cut, here a curb. This allows the cutting assembly and corresponding blade to accomplish a cut, here a horizontal cut, from the backside of the object (i.e., the side of the object opposite of the host machine). As shown in FIG. 4C, the cutting attachment apparatus extends over the object being cut, here a curb adjacent a driveway apron. The frame extending over the object being cut allows for an angled cut (i.e., in the direction shown at 'ca1') from the backside of the curb, here, the side adjacent the driveway apron.

Figure 5:
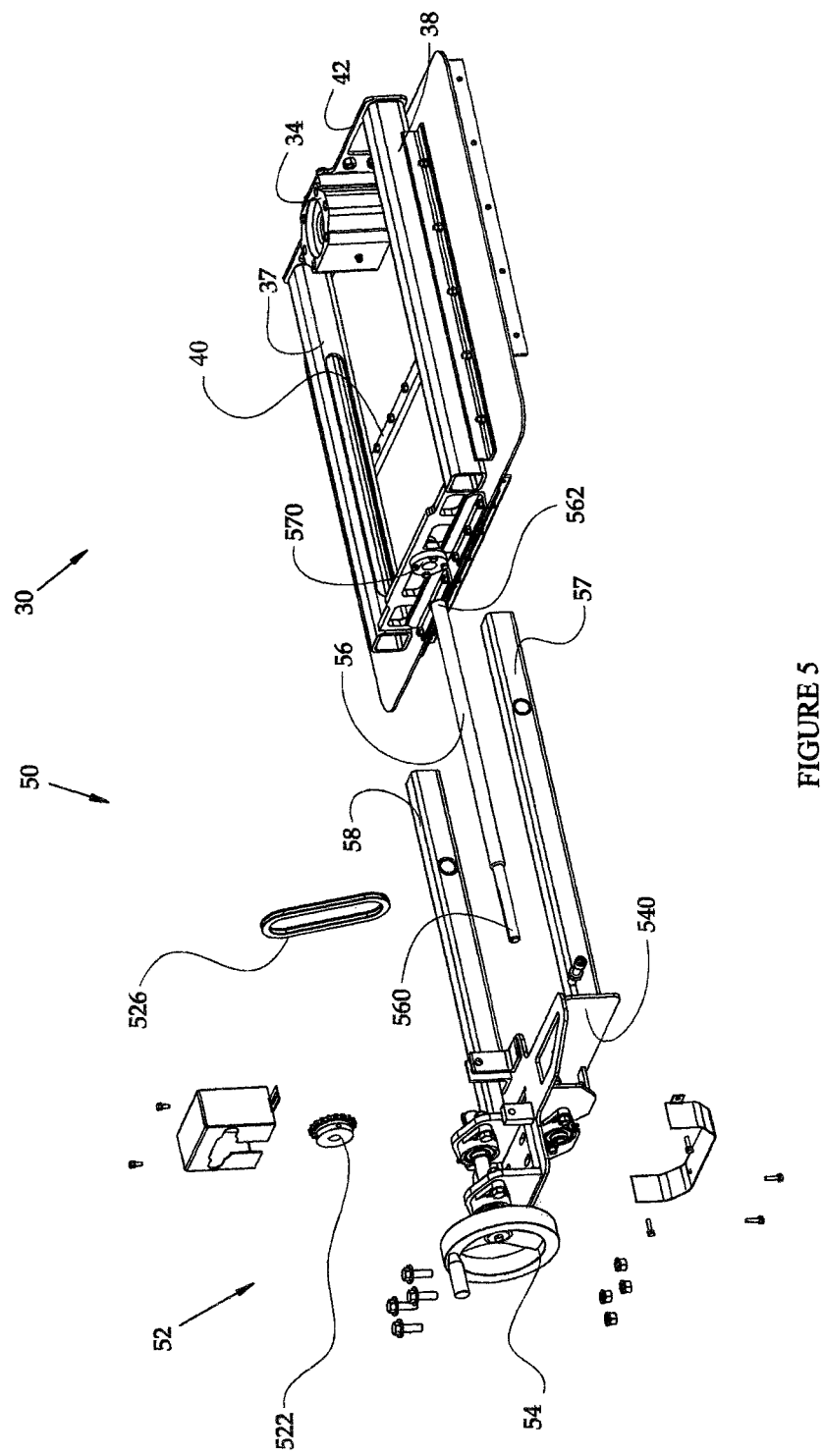
FIG. 5 is a partially exploded perspective view illustrating a cut insertion depth assembly 50 of FIG. 1, in accordance with an embodiment of the invention.
Figure 6:
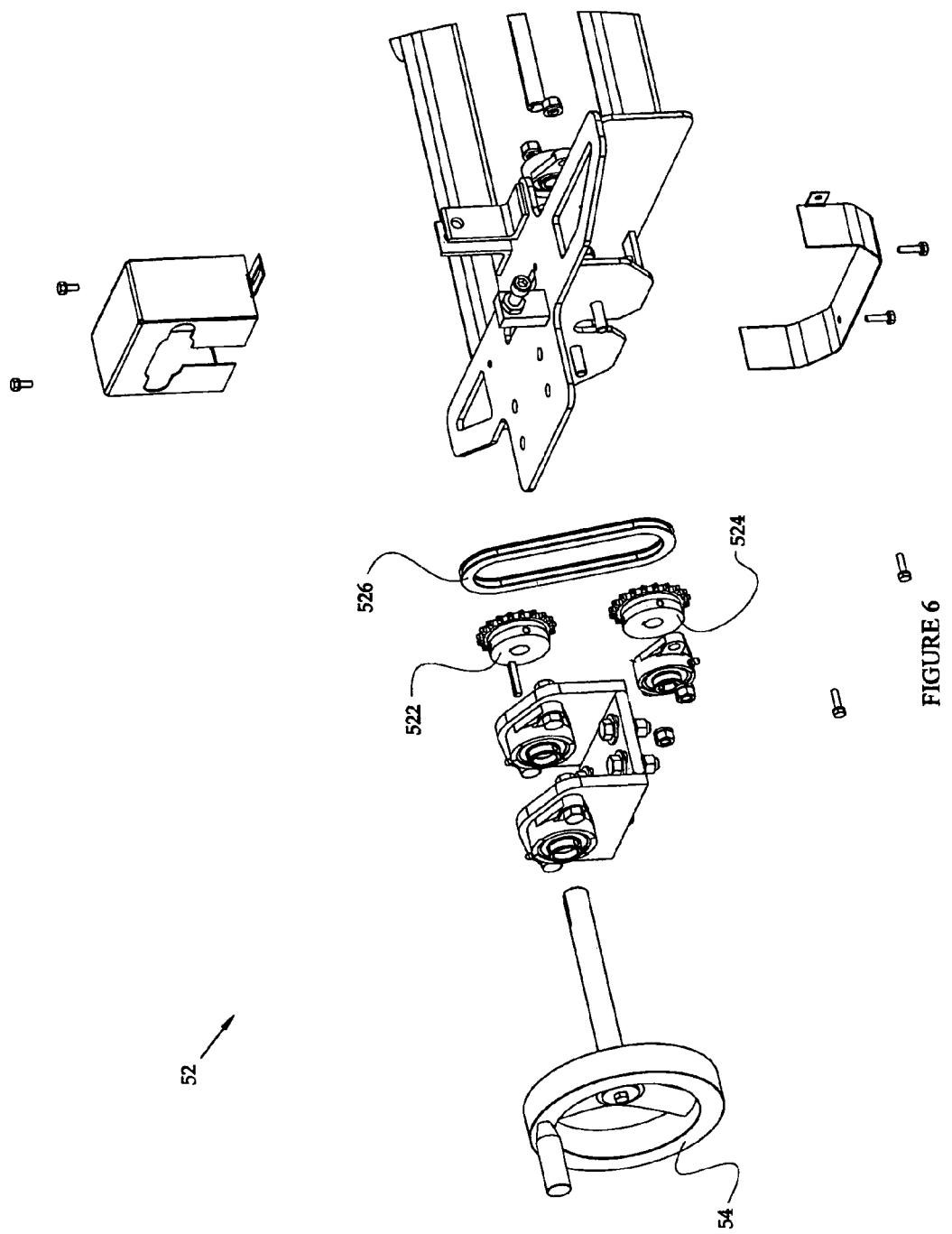
FIG. 6 is an exploded view of the cut insertion depth coupler 52 of FIG. 5, in accordance with an embodiment of the invention.

FIG. 5 is a partially exploded perspective view illustrating a cut insertion depth assembly 50 in accordance with an embodiment of the invention. FIG. 6 is an exploded view of the cut insertion depth coupler 52 shown in FIG. 5 in accordance with an embodiment of the invention. Referring to FIGS. 5 and 6, the cut insertion depth assembly 50 includes the fixed rails 57, 58 that couple with the frame 20 of the cutting attachment apparatus 10. The fixed rails 57, 58 are coupled with a cut insertion depth coupler 52, here a drive train, through a blade insertion depth cross member 540. The cut insertion depth coupler 52 further couples the cut angle actuator, here crank handle 54, with the cut depth rod 56. The cut insertion depth coupler 52 may include first and second cut insertion gears 522, 524, coupled by cut insertion chain 526. The crank handle 54 is coupled with the first gear 522, and the cut depth rod 56. The cut depth rod 56 includes a reduced-diameter portion 560, for coupling with the second gear 524 through a bearing of the cross member 540. Though not shown, the cut depth rod 56 may be a threaded rod, for example, an ACME threaded rod. A frame of the cutting assembly 30 may include an internally threaded coupler nut 570 having mating threading (not shown) with the cut depth rod. The other end of the cut depth rod 56, shown at 562, is threaded through and interfaces with the coupler nut 570 of the cutting assembly 30.

Thus, when the crank handle 54 is rotated in a first direction, for example, clockwise, the gears 522, 524 are rotated. This rotates the cut depth rod 56, in turn pushing against the mating threading of the coupler nut 570 to cause the receiving rails 37, 38 to be pushed along the corresponding fixed rails 58, 57 for increasing a depth of the cut. Similarly, when the crank handle 54 is rotated in a second direction, for example, counterclockwise, the gears 522, 524 rotate in the opposite direction, rotating cut depth rod 56 in the opposite direction. Such rotation of the threaded rod 56 pulls the mating threading of the coupler nut 570, thereby decreasing a depth of the cut.

Figure 8:
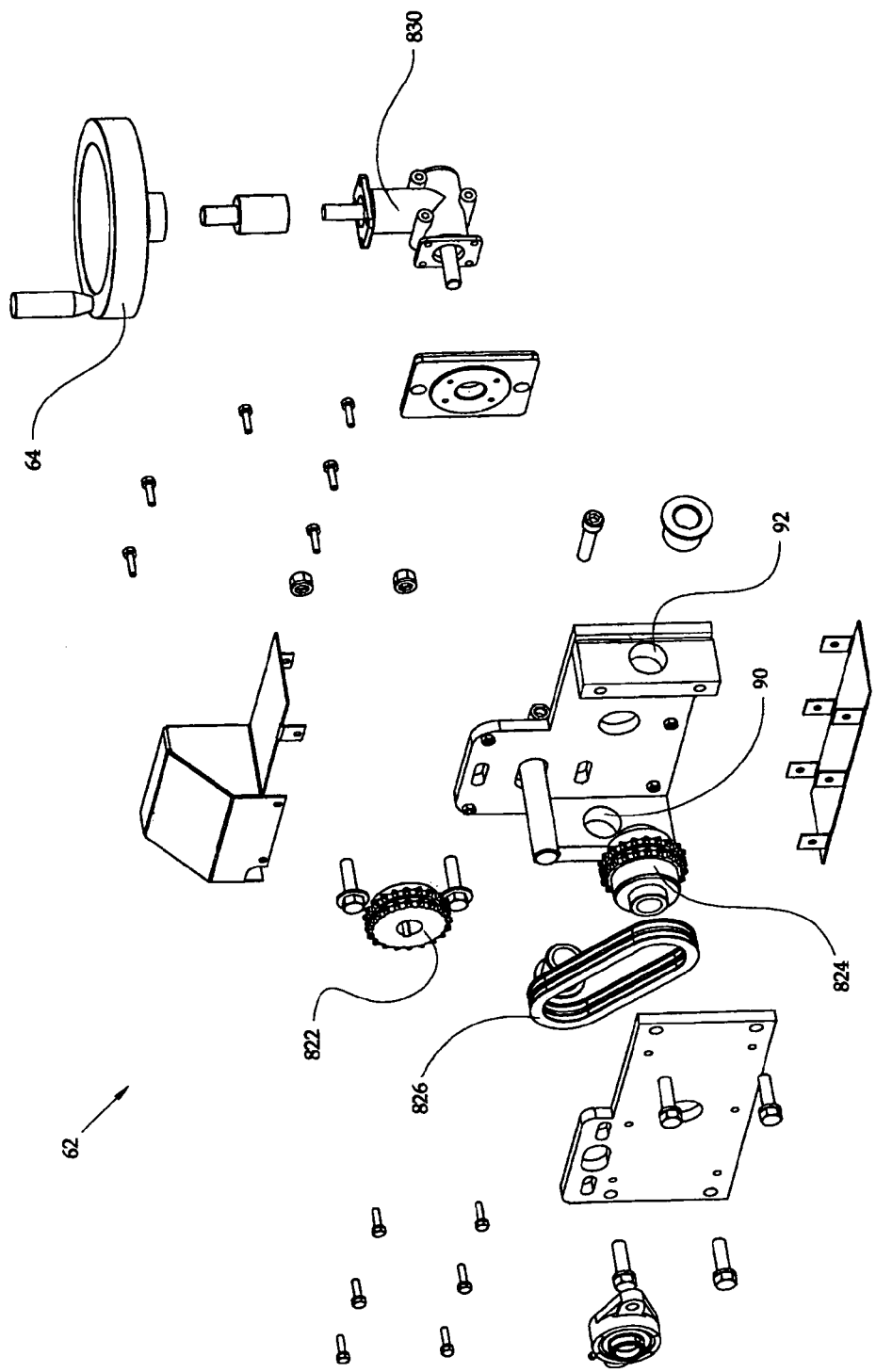
FIG. 8 is an exploded view of the cut angle coupler 62 of FIG. 1, in accordance with an embodiment of the invention.

FIG. 7A is a plan view of the cutting attachment apparatus 10 of FIG. 1 in accordance with an embodiment of the invention. FIG. 7B is a sectional view along lines G-G of the cutting attachment apparatus of FIG. 7A, and includes an expanded portion, in accordance with an embodiment of the invention. FIG. 8 is a partially exploded perspective view of the cut angle coupler 62, of FIG. 1, in accordance with an embodiment of the invention. Elements of FIG. 8 having reference numbers incremented by 300 with respect to the elements of FIG. 6 are similar in nature, except where distinguished, and will not be discussed in detail.

As shown in FIG. 8, cut angle actuator 64 is coupled through the gearing 830 with the first cut adjustment gear 822. The gearing 830 may be, for example, mating pinion gears allowing rotation through an angle. The second gear 824 differs from the second gear 524 in that the second gear 824 may include internal threading (not shown). Such threading may be directly applied to an inside surface of the gear 824, or provided via an insert for the gear. Referring to FIGS. 1, 7A-7B and 8, the cut angle rod 66 may be threaded (not shown), for example, as an ACME threaded screw, having a mating thread to the internal threading of gear 824. Thus, when the crank handle 64 is rotated in a first direction, for example, clockwise, the gearing 830 transfers the rotation to the gears 822, 824, thereby rotating the cut angle rod 66 to draw the rod 66 through the gear 824. In this way, an angle of a cut performed by the cutting assembly 30 is increased. Similarly, when the crank handle 64 is rotated in a second direction, for example, counter clockwise, the gearing 830 transfers the rotation to the gears 822, 824, in the opposite direction, thereby rotating the cut angle rod 66 to push the rod 66 from the gear 824 in the opposite direction. In this way, an angle of a cut performed by the cutting assembly 30 is decreased.

Figure 9A:
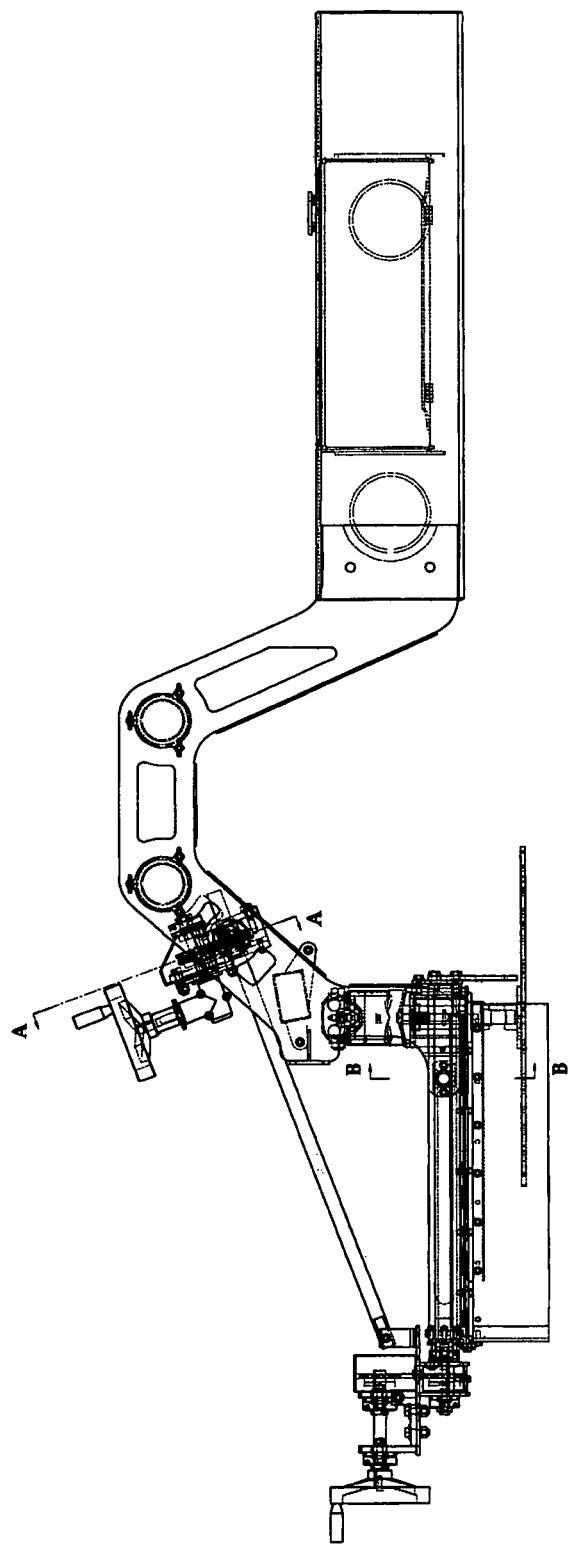
FIG. 9A is a side view of the cutting attachment apparatus 10 of FIG. 1, in accordance with an embodiment of the invention.
Figure 9B:
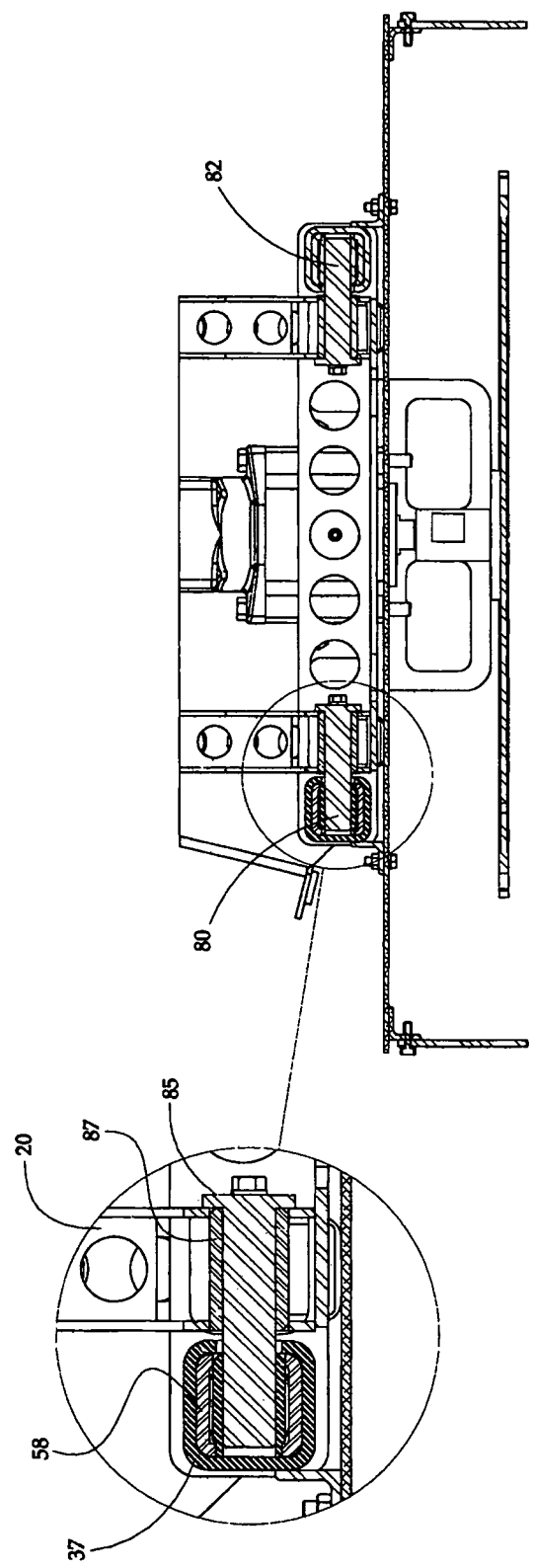
FIG. 9B is a is sectional view along lines B-B of the cutting attachment apparatus of FIG. 9A, in accordance with an embodiment of the invention.
Figure 9C:
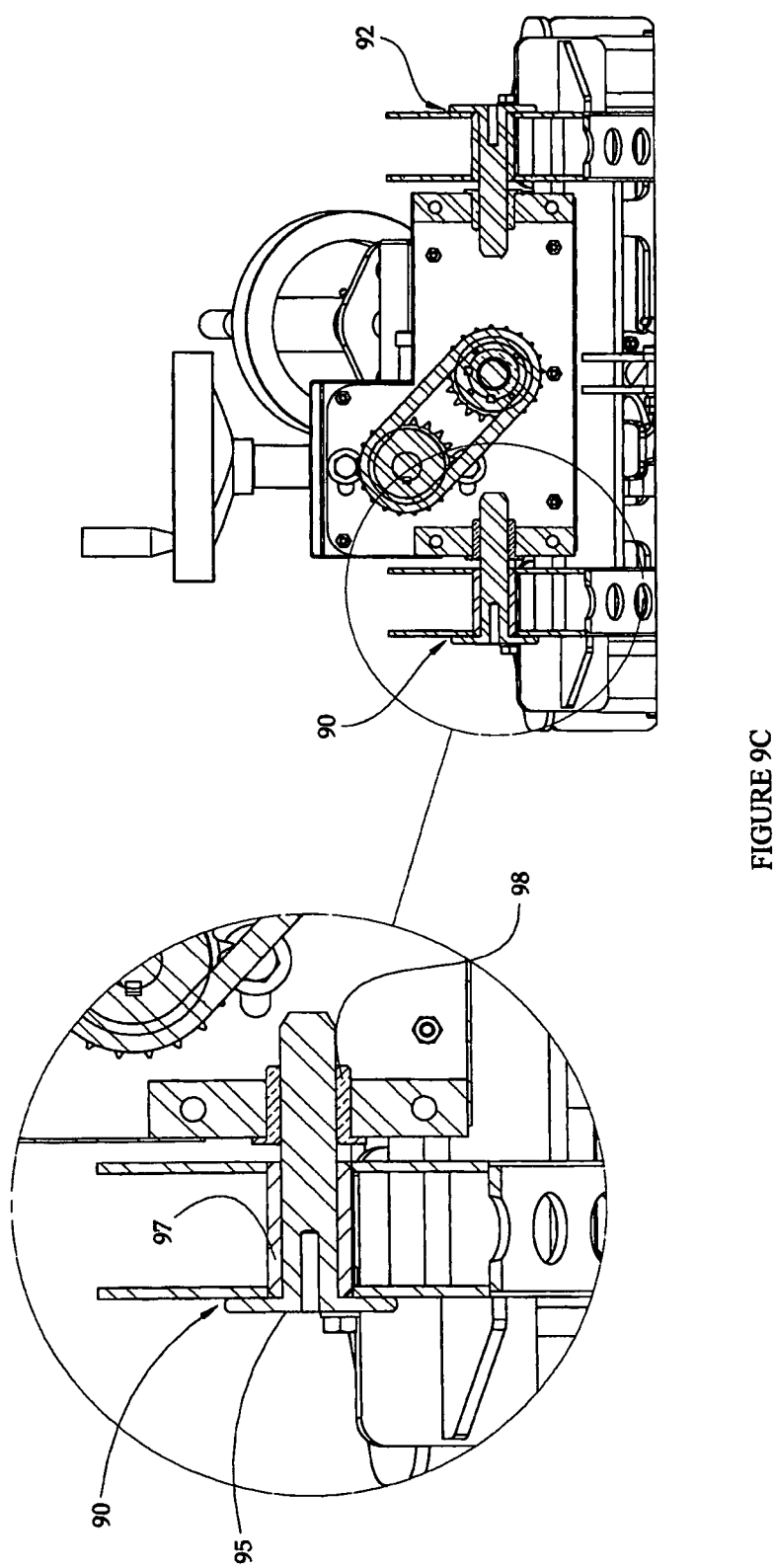
FIG. 9C is a is sectional view along lines A-A of the cutting attachment apparatus of FIG. 9A in accordance with an embodiment of the invention.

FIG. 9A is a side view of the cutting attachment apparatus 10 of FIG. 1, in accordance with an embodiment of the invention. FIG. 9B is a sectional view along lines B-B of the cutting attachment apparatus of FIG. 9A and having an expanded portion showing the pivot point 80, in accordance with an embodiment of the invention. FIG. 9C is a sectional view along lines A-A of the cutting attachment apparatus of FIG. 9A, and having an expanded portion showing the pivot point 90, in accordance with an embodiment of the invention. The FIGS. 9A-9C provide more detail for the pivot points 80, 82, 90 and 92.

As shown in FIGS. 9A-9C, a first set of pivot points 80, 82 couple the cutting assembly 30 with the fixed rails 57, 58. The pivot point 80 may comprise a pivot pin 85 passing through a hole 87 in the frame 20, and seated within the fixed rail 58. Though not discussed in detail, pivot point 82 may be similar in nature. As shown in FIG. 9C, a second set of pivot points 90, 92 may couple the cut angle coupler 62, here a drive train, with the frame 20. Similar to as discussed with respect to the pivot point 80, the pivot point 90 may comprise a pivot pin 95 that passes through a hole 97 of the frame 20, and may be seated within the cut angle coupler 62, for example, through a bushing or bearing 98. Though not discussed in detail, the pivot point 92 may be similar in nature to the pivot point 90.

Having the pivot points 80, 82 allow the cutting assembly 30 to pivot with respect to frame 20, where the pivot point 90, 92 allow the cut adjustment coupler 62 to pivot as the cutting assembly 30 pivots. This allows cut angle rod 66 to remain square and true as it feeds through the lower gear 824 of the cut angle coupler 62.

Figure 10:
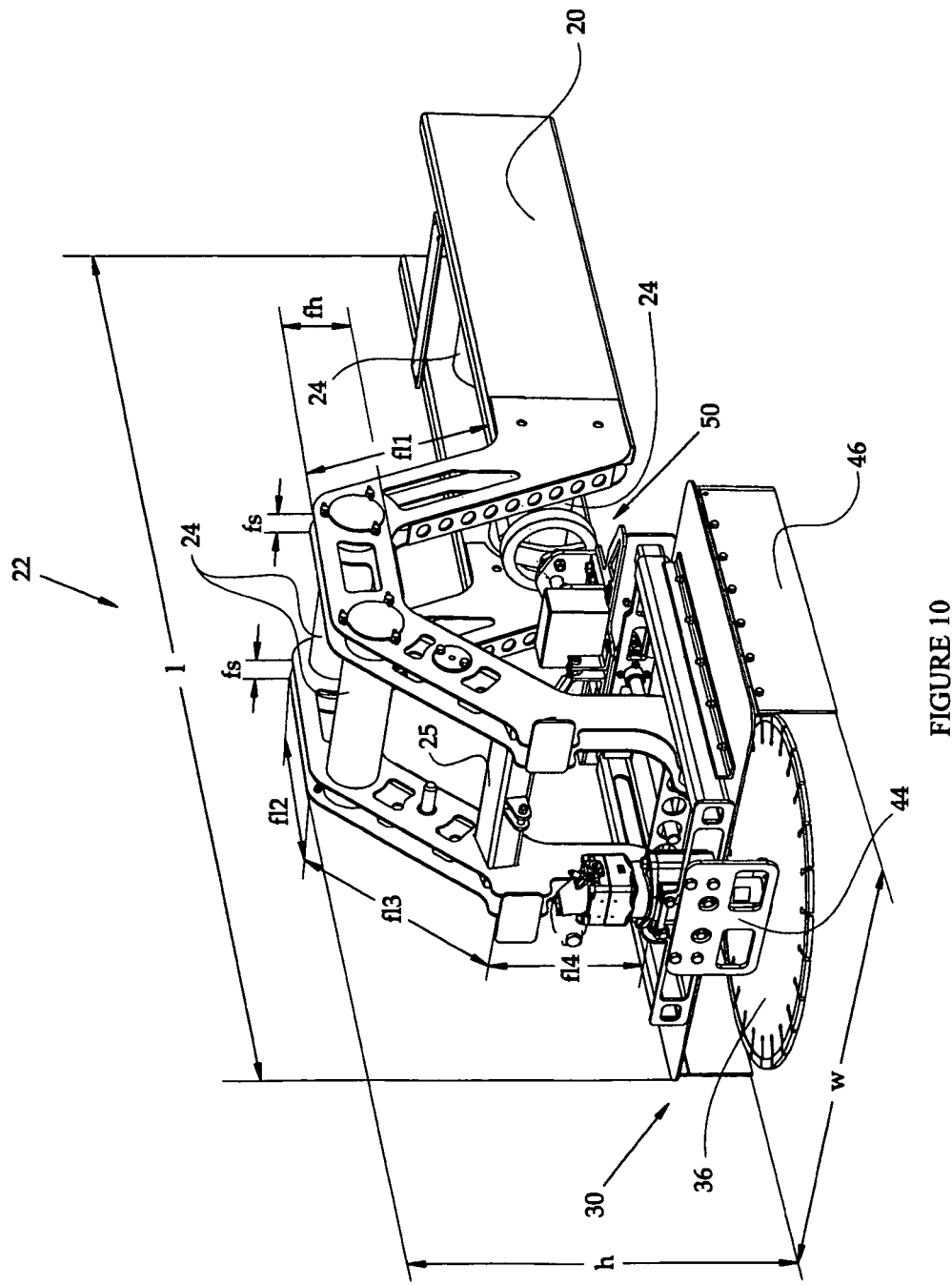
FIGS. 10 and 11 are perspective and side views, respectively, of the cutting attachment apparatus 10 of FIG. 1, showing the cutting assembly reversed, in accordance with an embodiment of the invention.
Figure 11:
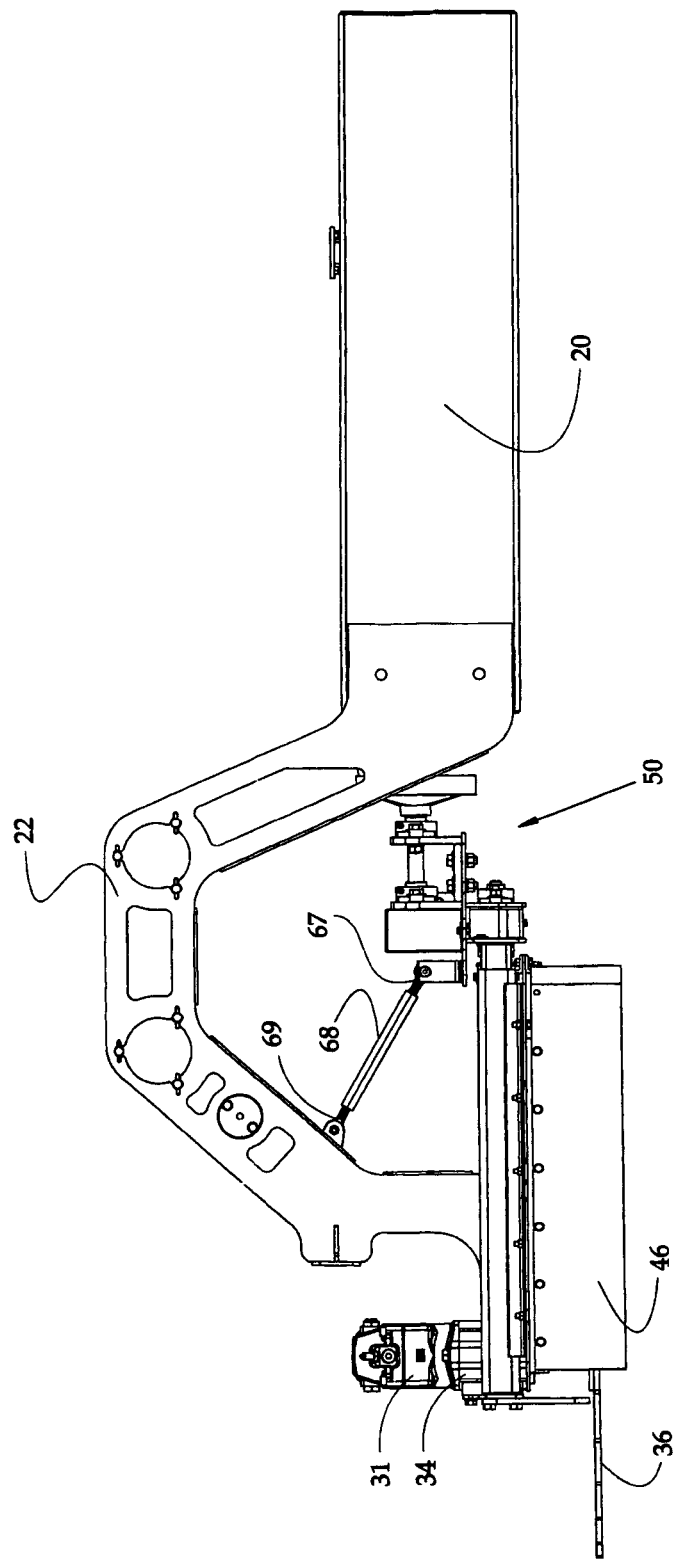

FIGS. 10 and 11 are perspective and side views, respectively, of the cutting attachment apparatus 10 of FIG. 1, showing the cutting assembly reversed for performing a front cut, in accordance with an embodiment of the invention.

Referring to FIGS. 1-3 and 9-11, the cutting assembly 30 may be reversible, for example, for performing cuts outside the perimeter of the frame 20. In accordance with an embodiment of the invention, to reverse the cutting assembly 30, pivot pins, for example, pivot pin 85, are removed from pivot points 80, 82. Cut angle rod 66 is disconnected at coupling point 67 and removed from the cut angle adjustor 62, for example by unscrewing the cut angle rod from the internally threaded portion of gear 824. The cutting assembly 30 may then be removed from the frame 20, turned 180 degrees, and replaced onto the frame 20 with pivot pins at the pivot points 80, 82. An inversion tie rod 68 is coupled with coupling points 67 and 69. In this way, the cutting assembly 30 may be reversible, allowing for the cutting element 36 to accomplish a cut outside the perimeter of the frame 20.

The inversion tie rod 68 may be, for example, a turnbuckle, allowing the angle of the cut to be adjusted, for example, to achieve a level adjustment of the cutting assembly 30, or to provide other angle adjustments to the forward cut of the reversed cutting assembly 30. The angle adjustment coupler 62 may, but need not, be removed when reversing the cutting assembly.

Figure 12:
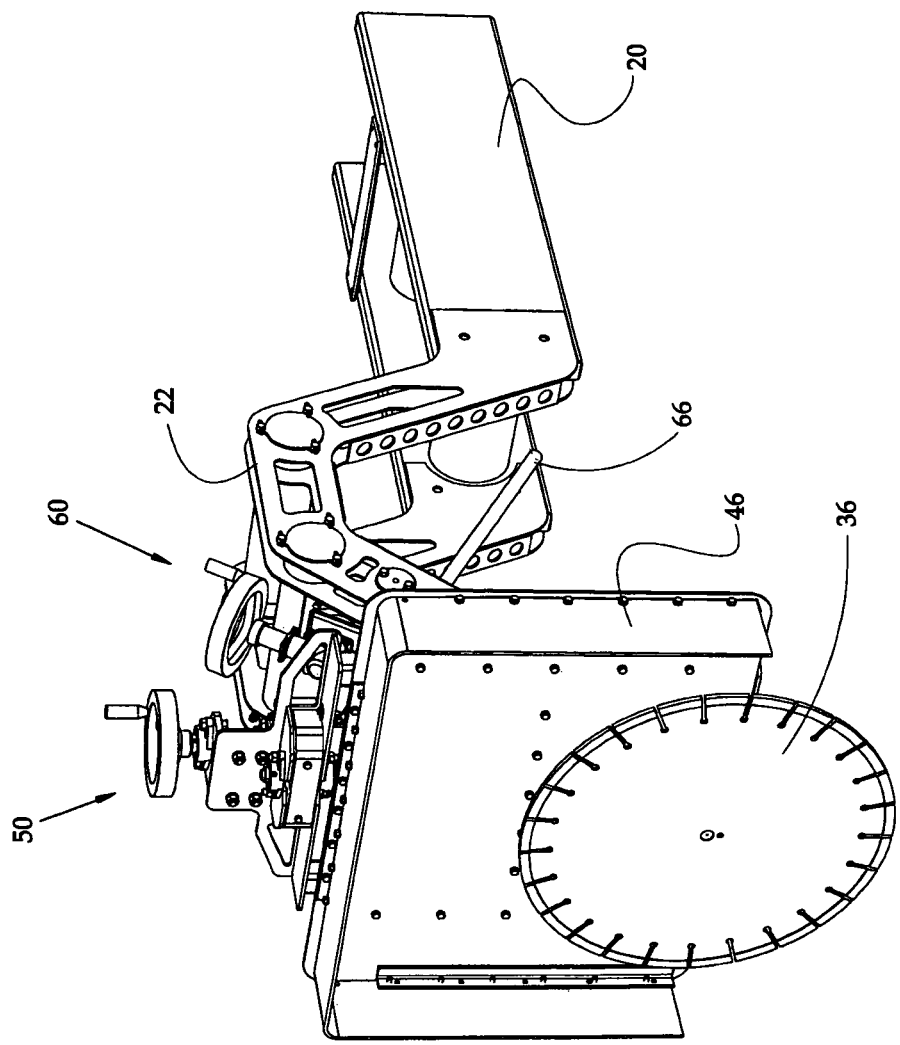
FIGS. 12 and 13 are perspective and side views, respectively, of the cutting attachment apparatus 10 of FIG. 1, showing the cutting assembly adjusted for a substantially vertical cut, in accordance with an embodiment of the invention.
Figure 13:
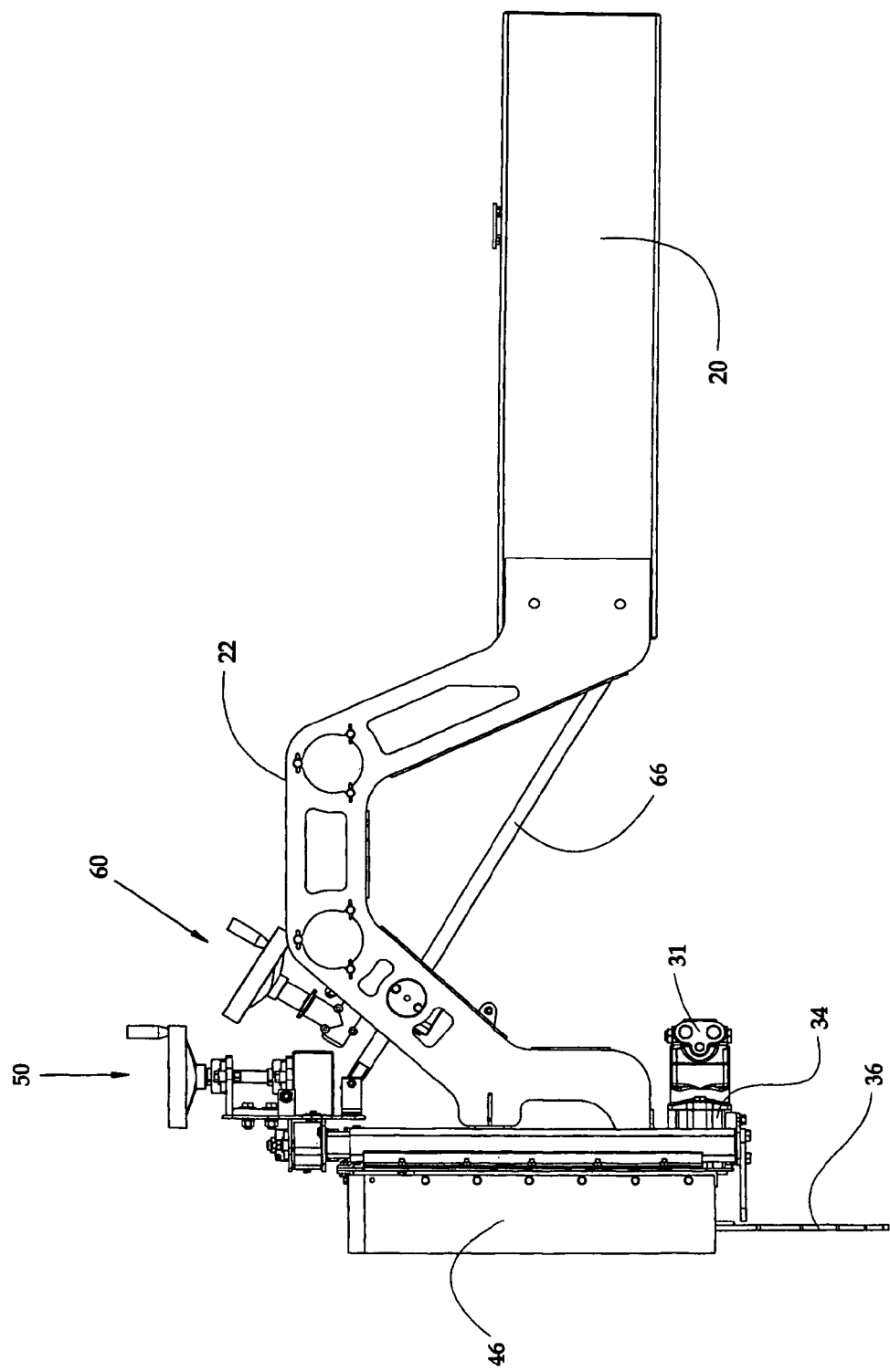

FIGS. 12 and 13 are perspective and side views, respectively, of the cutting attachment apparatus 10 of FIG. 1, showing the cutting assembly adjusted for a substantially vertical cut, in accordance with an embodiment of the invention. As shown in FIGS. 12 and 13, adjustment to a substantially vertical cut may be accomplished without any removal of hardware or other retrofitting of the cutting attachment apparatus 10. For example, such an adjustment to a substantially vertical cut may be accomplished through the cut angle assembly 60, where the cut angle actuator 64 is actuated to draw the cut angle rod 66 through the cut angle coupler 62 until the cutting assembly 30 and corresponding cutting element 36 is a substantially vertical 90 degree angle. Actuation of the cut angle adjustment actuator in the opposite direction decreases the cutting angle of the cutting assembly 30.

Operation of the cutting attachment apparatus 10 will be discussed. In operation, an operator may couple the cutting attachment apparatus 10 to a walk behind host machine, such as a Toro Dingo, or to any skid steer loader. This is accomplished through the host machine interface 70, for example, connecting with the host machine 410 at the interface for bucket or fork assembly. Hydraulic hoses (not shown) would be connected between the cutting attachment apparatus and the host machine, for example, to connect a host machine hydraulic Power Take Off (PTO) port with the cutting assembly hydraulic motor 31. Such host machines have capabilities for raising connected buckets and forks to heights, for example in the Toro Dingo case, of approximately six feet in height, through 'boom-up' and 'boom-down' operations. Further, such host machines have capability of providing 'curl-up' and 'curl-down' operations for the tips of any fork or bucket attached to the machine. And, such host machines include PTO hydraulic ports allowing control of an additional hydraulic function or accessory.

After connection with the host machine, the operator is able to raise the attachment to a desired height limited only by the capabilities of the host machine. Thus, a height of at least six feet may be achieved from a Toro Dingo host machine, and much greater heights achieved from other host machines when connected with the cutting attachment apparatus. With the desired cut in mind, for example, to provide a cut to a seven inch thick concrete curb, an operator may raise the cutting attachment apparatus (via the host machine by a 'boom-up' operation, in the direction 'ca3' of FIG. 1) to a comfortable level for adjusting cut insertion depth and cut angle. The operator may adjust the cut insertion depth, for example, accounting for the thickness of the curb. Such an adjustment may be accomplished by the operator actuating the cut angle actuator (i.e., crank handle 54) of the cut insertion depth assembly 50 of the cutting attachment apparatus 10. Actuating of the crank handle in the desired direction will extend or retract the cutting element 36 (for example, an aggregate cutting blade) in the direction 'id' shown in FIG. 1, to a desired cut insertion depth. For example, the cut insertion depth may be adjusted to twelve inches accounting for the desired angle of cut through the particular curb being cut.

The operator may then adjust the cut angle of the cutting element using the cut angle assembly 60, through the cut angle actuator 64 (here, crank handle 64). Such actuation turns the cut angle rod 66, to increase or decrease the angle of the cut in the direction indicated at 'ca1' of FIG. 1. The host machine may then be raised or lowered to the desired height for achieving the cut. Once a desired cut angle, depth, and height is set, the operator may then align the host machine 410 coupled with cutting attachment apparatus 10 to the desired orientation for achieving the cut. For example, such a cut may be as shown in FIG. 4A for horizontally cutting a concrete curb, or as shown in FIG. 4C for an angled cut to a concrete curb adjacent a driveway apron.

The host machine may be driven in a substantially linear fashion by the operator in a direction substantially parallel with the curb or other object being cut, to achieve the cut. In this way, a cut to an object may be achieved substantially within the perimeter of the attachment frame 20. As an example, where described, the cut angle assembly 60 adjusts an angle of cut perpendicular to the angle of travel of the host machine just described. Should it be desired by the operator, the 'curl-up' or 'curl-down' functions of the host machine may be utilized to adjust a cut angle of the cutting element perpendicular to that achieved by the cut angle assembly 60, for example in the 'ca2' direction shown in FIG. 1. The 'ca2' adjustment, alone or in conjunction with the 'ca3' adjustment (both shown in FIG. 1) may be used by an operator to accommodate an uneven or graded surface in contact with the host machine 410 and allows for operational variances, with respect to ground/soil condition, grade, and approach, to be addressed.

One skilled would further realize that if desired, vertical cuts may be accomplished in a similar fashion as described above. The cut adjustment assembly 60 may be adjusted for a 90 degree vertical cut, for example, to separate an existing curb from a driveway apron, or for performing vertical cuts of existing vertical structures, such as walls or foundations.

Further, one skilled will realize that in a similar fashion as described above, the cutting assembly 30 may be reversed. This would allow a substantially horizontal cut substantially outside the perimeter of the frame 20, for example to achieve a horizontal cut to an adjacent wall, bollard, pier or other structure.

The embodiments of the orientation of the cutting assembly 30 of FIG. 1, and the reversed cutting assembly 30 shown at FIG. 10, permit a default plunge cut within a perimeter of the attachment frame. Such a cut is shown, for example, in FIG. 4A for cuts to a curb, and FIG. 4C for cuts to a curb adjacent an object such as driveway apron. Such a cut is further shown in FIG. 10, with the cutting assembly 30 reversed.

Referring back to FIG. 4A, for a plunge cut, an operator would use a slight approach angle, and continue with a forward or backward operation of the host machine 410 to increase or decrease the approach angle to the desired initial cut depth. Once the "break" cut through a surface of the object being cut is established, the host machine may then be oriented parallel to the cutting surface/material/medium (in cases of a horizontal cut), and the depth may then be adjusted directly via the insertion depth assembly 50.

Figure 14:
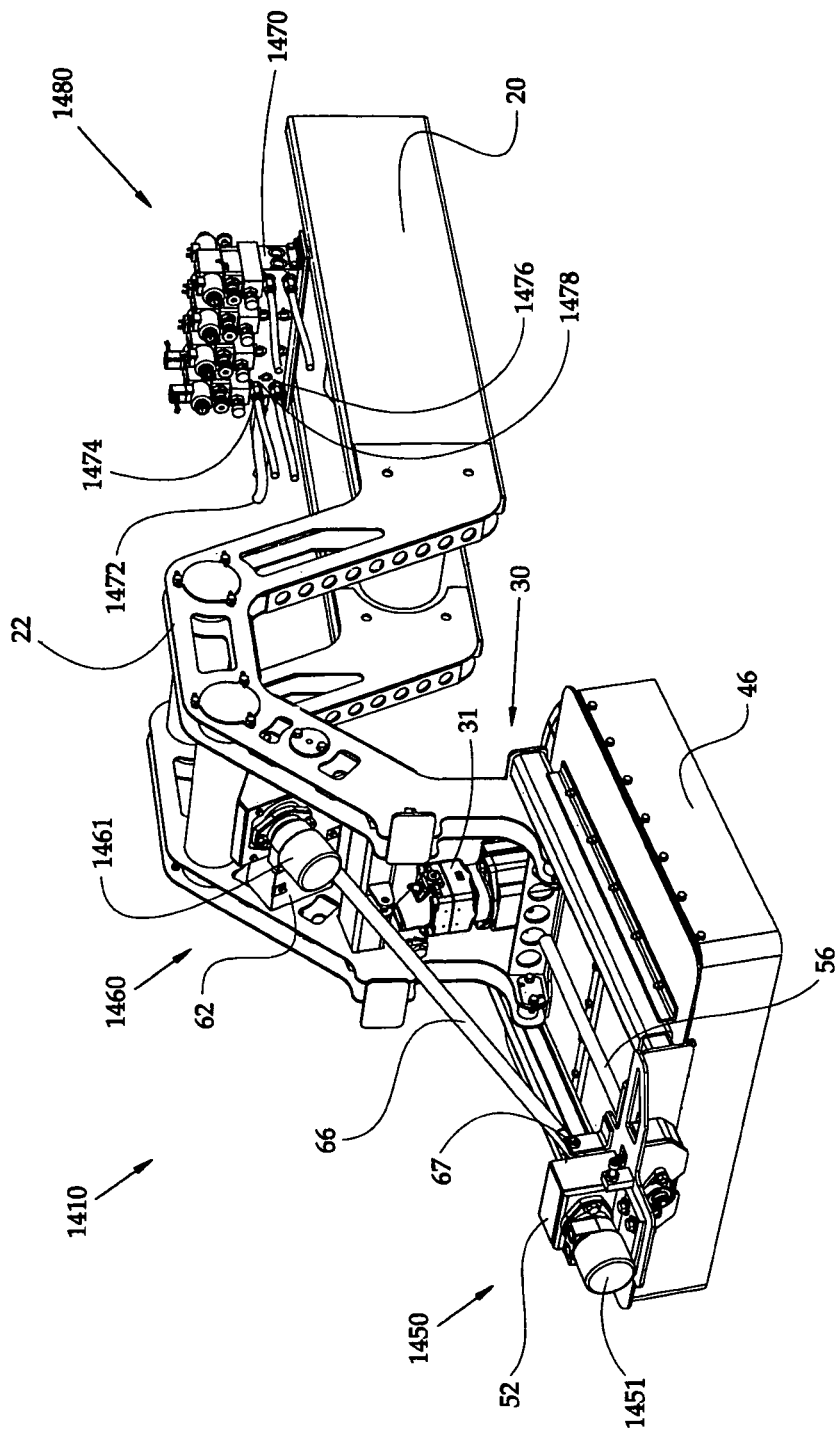
FIG. 14 is a perspective view of a cutting attachment apparatus, in accordance with an embodiment of the invention.
Figure 15:
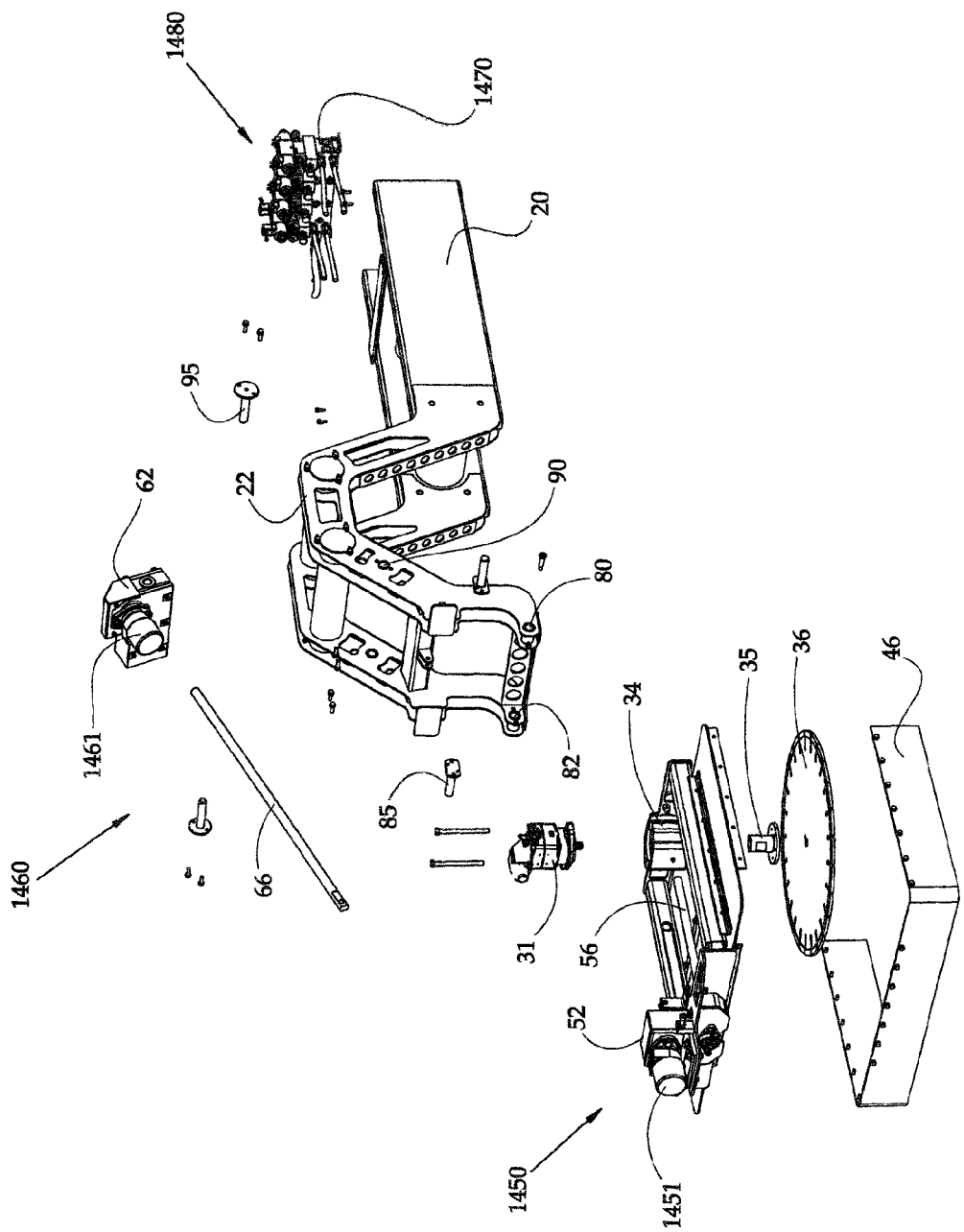
FIG. 15 is a partially exploded view of the cutting attachment apparatus 1410 of FIG. 14, in accordance with an embodiment of the invention.

FIG. 14 is a perspective view of a cutting attachment apparatus allowing for remote operation of blade angles and depth, in accordance with an embodiment of the invention. FIG. 15 is a partially exploded view of the cutting attachment apparatus 1410 of FIG. 14 in accordance with an embodiment of the invention. The cutting attachment apparatus 1410 of FIGS. 14 and 15 differ from that of FIGS. 1 and 2 in that the cut insert depth adjustment assembly and the cut angle assembly utilize hydraulic actuators, and a hydraulic manifold and plurality of valves to control the hydraulic actuators. Thus, components of FIGS. 14 and 15 having reference numbers that are the same as in FIGS. 1 and 2 are the same and will not be discussed in detail. Though some elements of FIGS. 14 and 15 are not marked, such elements are similar to elements of FIGS. 1-3, and may operate in a similar fashion.

As shown in FIGS. 14 and 15, a cut attachment assembly 1410 utilizes a cut insertion depth adjustment assembly 1450 differs from the cut insertion depth adjustment assembly 50 mainly in that the cut insertion depth adjustment assembly 1450 utilizes a cut insertion depth adjustment actuator that is a cut insertion depth actuator motor 1451, for example, a reversible hydraulic motor. As further shown, the cut angle assembly 1460 differs from the cut angle assembly 60 mainly in that it utilizes a cut angle adjustment actuator that is a cut angle adjustment motor 1461, for example, a reversible hydraulic motor.

Thus, actuation of the cut insertion depth actuator motor 1451 causes the cut depth rod 56 to rotate, pushing or pulling against coupler 570 of the cutting assembly 30, as discussed below. This adjusts the insertion depth of a cut made by the cutting assembly 30. Operation of the cut insertion depth assembly 1450 will be discussed in more detail below with respect to FIGS. 16 and 17.

Actuation of the cut adjustment actuator 1461 causes, through the cut angle adjustment coupler 62, the cut angle rod to be drawn through or extended from the coupler 62, thereby increasing or decreasing an angle of cut of the cutting assembly 30. Operation of the cut angle assembly 1460 will be discussed in more detail below with respect to FIG. 18.

Further shown in FIGS. 14 and 15, is a hydraulic manifold 1470 coupled with the frame 20, which may be utilized to power the various hydraulic motors and any other desired hydraulic components of the cut attachment apparatus 1410. Power Take Off (PTO) supply and return hydraulic lines from a host vehicle may connect with the hydraulic manifold 1470 at respective supply P-port 1472 and return T-port 1474. P-port 1472 and T-port 1474 are difficult to see in FIGS. 14 and 15, and are more clearly shown in FIGS. 21-22. Further shown at the manifold are a plurality of supply ports, for example A-ports 1476, and a plurality of return ports, for example, B-ports 1478, that supply pressurized hydraulic fluid from the manifold 1470 hydraulic components of the cutting attachment apparatus, for example, hydraulic motors 31, 1451 and/or 1461. Connections between the manifold 1470 and respective hydraulic components are discussed in more detail with respect to the discussion of FIGS. 21-24.

As further shown in FIG. 14, a plurality of stacked hydraulic valves, including pressure reducing valves, flow valves and directional valves may be provided, for example, as shown generally at 1480. Such valves may be utilized to control pressure and flow from the PTO of a host machine to the various hydraulic motors, or other hydraulic attachments utilized on the cutting attachment apparatus 1410. Valves 1480 will be discussed in further detail below with respect to FIGS. 21-24.

Figure 16:
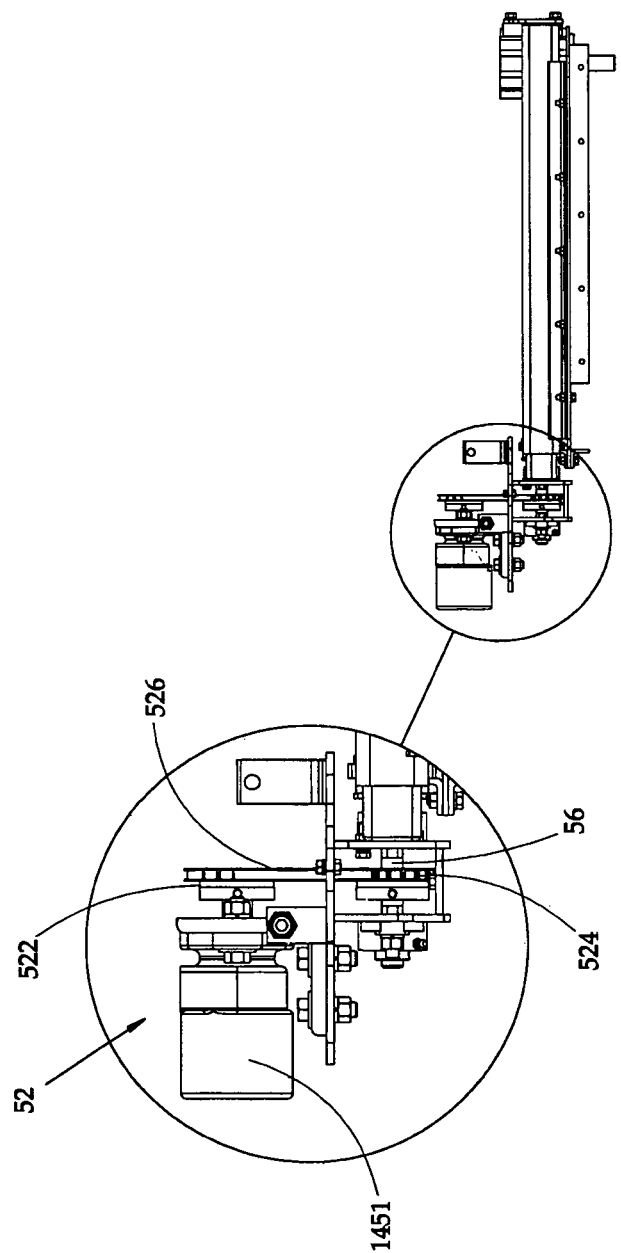
FIG. 16 is a partial side view of the cut insertion depth assembly 1450 of FIG. 14, in accordance with an embodiment of the invention.
Figure 17:
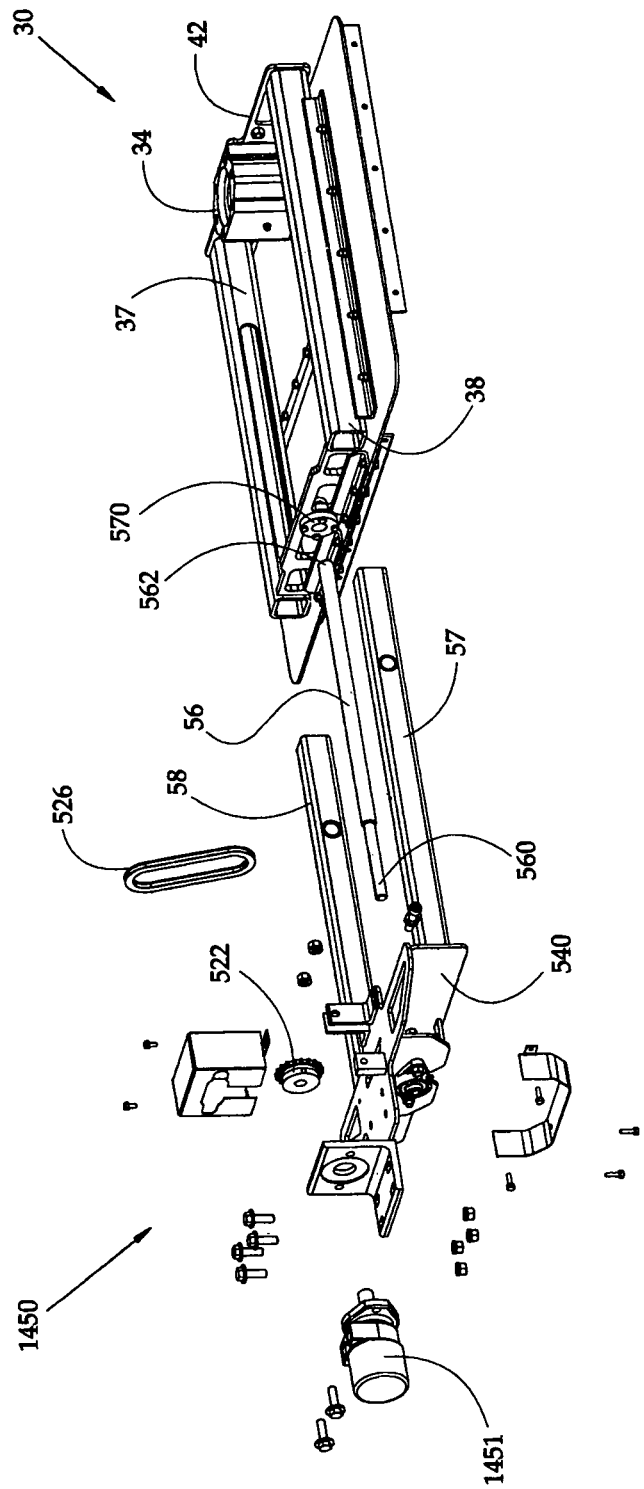
FIG. 17 is a partially exploded perspective view illustrating the cut insertion depth assembly 1450, in accordance with an embodiment of the invention.

FIG. 16 is a partial side view of the cutting attachment apparatus 1410 of FIG. 14, illustrating a cut insertion depth assembly 1450, in accordance with an embodiment of the invention. FIG. 17 is a partially exploded perspective view illustrating a cut insertion depth coupler 52, in accordance with an embodiment of the invention. Elements of FIGS. 16-17 having the same reference numbers as elements of FIGS. 1 and 5-6, are the same and will not be discussed in detail.

As shown in FIGS. 16-17, a cut insertion depth actuator is shown as a motor 1451, here a reversible hydraulic motor. When the reversible hydraulic motor is operated in a first direction, for example, clockwise, the gears 522, 524 are rotated, thereby rotating the cut depth rod 56. Similar to as discussed above with respect to FIGS. 5-6, rotation of the cut depth rod 56 pushes against the mating threading of the coupler nut 570 of the cutting assembly 30, thereby increasing a depth of the cut. Similarly, when the reversible hydraulic motor 1451 is operated in a second direction, for example, counterclockwise, the cut depth rod 56 is rotated in the opposite direction, pulling the mating threading of the coupler nut 570 to decrease a depth of the cut. Controlling of the reversible hydraulic motor 1431 will be discussed in more detail with respect to FIGS. 21-25.

Figure 18:
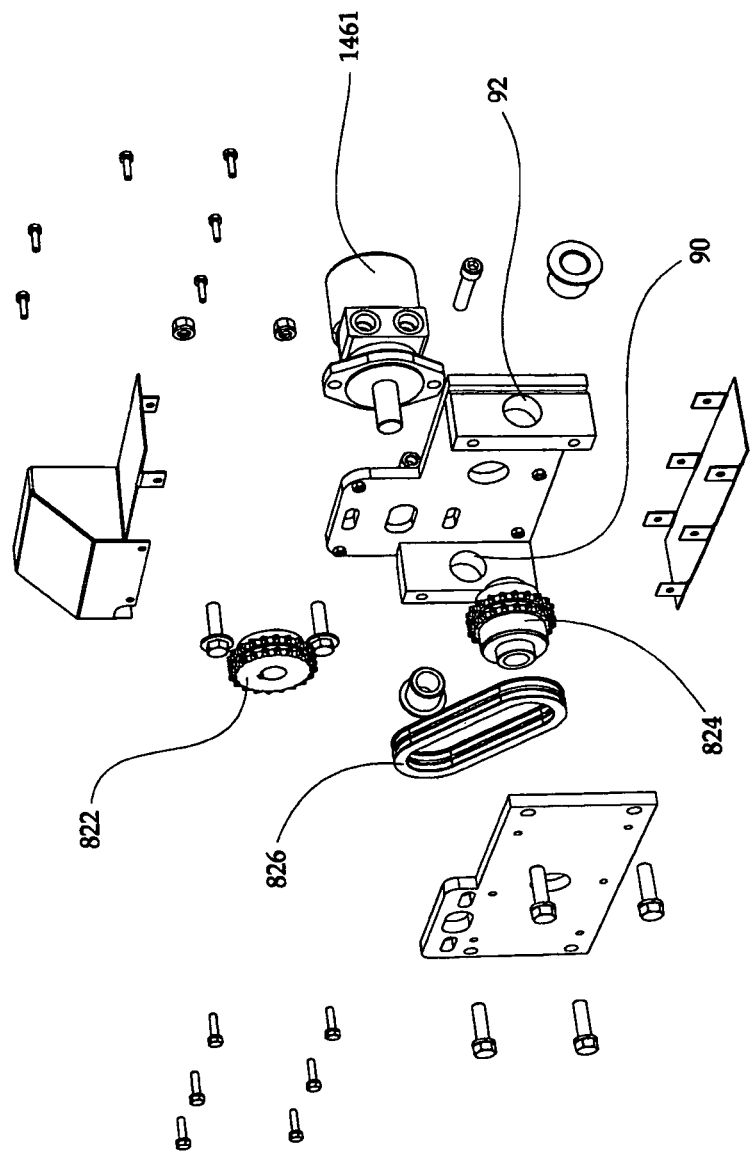
FIG. 18 is an exploded view of the cut angle coupler 62, in accordance with an embodiment of the invention.

FIG. 18 is a partially exploded perspective view of the cut angle coupler 62 of FIG. 14, in accordance with an embodiment of the invention. Elements of FIG. 18 identified with the same reference numbers as elements of FIG. 8 are the same and will not be discussed in detail.

As shown in FIG. 18, cut angle actuator 64, here shown as a reversible hydraulic motor 1461, is coupled with the first cut adjustment gear 822. The first gear 822 is coupled with the second gear 824 via chain 826. When the reversible hydraulic motor 1461 is operated in a first direction, for example, clockwise, the gearing 830 transfers the rotation to the gears 822, 824, thereby rotating the cut angle rod 66 to draw the rod 66 through the gear 824. As discussed above, the angle of a cut performed by the cutting assembly 30 is increased. Similarly, when the reversible hydraulic motor 1451 is rotated in a second direction, for example, counter clockwise, the gearing 830 transfers the rotation to the gears 822, 824, in the opposite direction, thereby rotating the cut angle rod 66 to push the rod 66 from the gear 824. In this way, the angle of a cut performed by the cutting assembly 30 is decreased.

Figure 19:
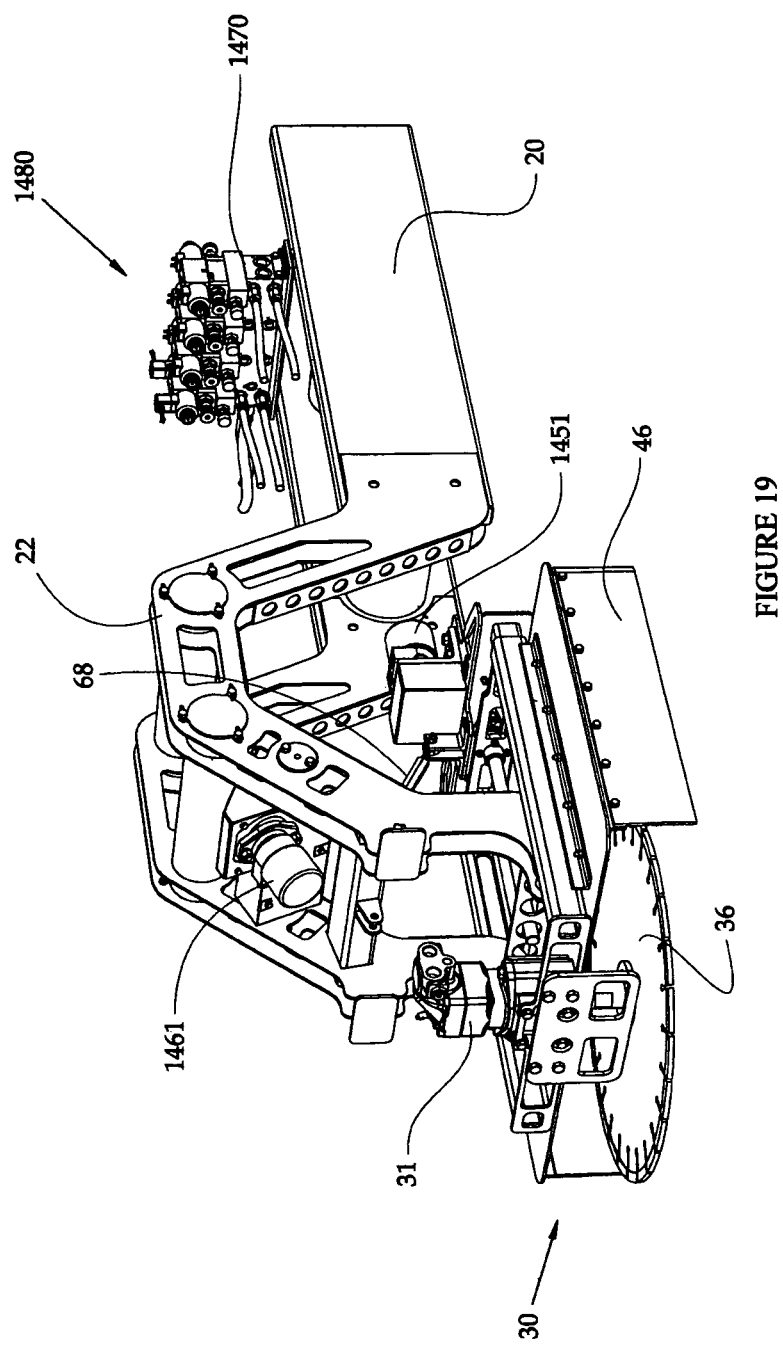
FIG. 19 is a perspective view of the cutting attachment apparatus 1410 of FIG. 14, showing the cutting assembly reversed, in accordance with an embodiment of the invention.

FIG. 19 is a perspective view of the cutting attachment apparatus 1410 of FIG. 14 showing the cutting assembly reversed for performing a front cut, in accordance with an embodiment of the invention. Similar to as discussed with reference to FIGS. 10 and 11, the cutting assembly 30 may be reversible, for example, for performing cuts outside the perimeter of the frame 20. Such reversing of the cutting head 30 is accomplished in a manner similar to as discussed in detail above with respect to FIGS. 10 and 11, and will not be discussed in detail.

Figure 20:
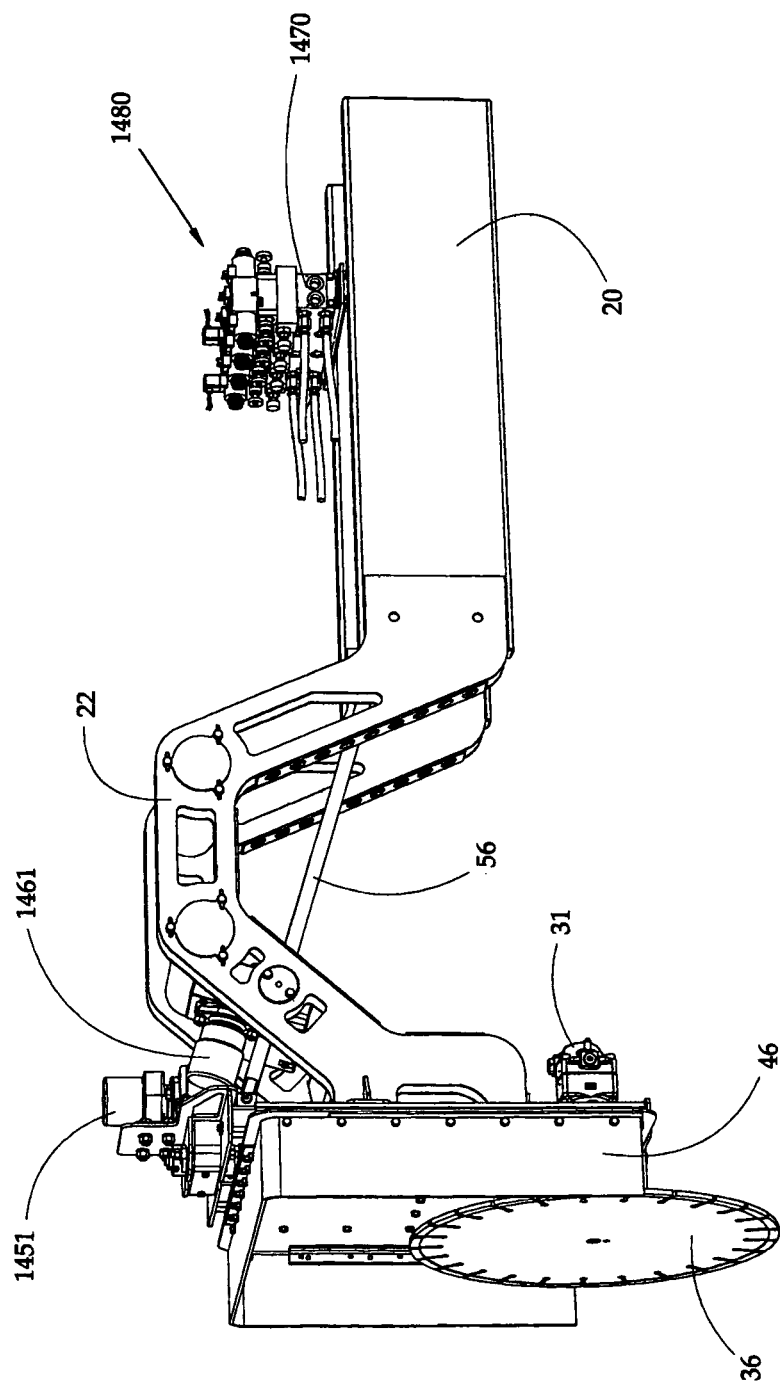
FIG. 20 is a perspective of the cutting attachment apparatus 1410 of FIG. 14, showing the cutting assembly adjusted for a vertical cut, in accordance with an embodiment of the invention.

FIG. 20 is a perspective view of the cutting attachment apparatus 1410 of FIG. 14 showing the cutting assembly adjusted for a vertical cut, in accordance with an embodiment of the invention. Adjusting the cutting assembly 30 for a vertical cut is accomplished in a similar fashion as discussed above with respect to FIGS. 12 and 13, and may be accomplished without any removal of hardware or other retrofitting of the cutting attachment apparatus 10. Similar to as discussed above with reference to FIGS. 12 and 13, such an adjustment to a substantially vertical cut may be accomplished through the cut angle assembly 60, where the cut angle adjustment actuator 64, here a reversible hydraulic motor 1461, is actuated to draw the cut angle rod 66 through the cut angle coupler 62 until the cutting assembly 30 and corresponding cutting element 36 is a substantially vertical 90 degree angle. Actuation of the cut angle adjustment actuator reversible hydraulic motor 1461 in the opposite direction decreases an angle of cut of the cutting assembly 30.

General operation of the cutting attachment apparatus 1410 of FIGS. 14-20 is similar to operation of the cutting attachment apparatus 10 described above with respect to FIGS. 1-13. As described with respect to FIGS. 14-20, reversible hydraulic motors may be employed as actuators 1451 and 1461 to make the respective cut depth and cut angle adjustments of the cut insertion depth assembly 1450 and cut angle assembly 1460, respectively. Hydraulic manifold 1470, along with valves 1480, junction box 480 and a pendent 2400 (described below with reference to FIG. 24) may be utilized in controlling the reversible hydraulic motors 1451 and 1461 in accomplishing depth and angle adjustments of the cutting assembly 30. FIGS. 21-25 describe control of the hydraulic manifold 1470, the valves 1480 in operating the cutting attachment apparatus of 1410, in accordance with embodiments of the invention.

Figure 21:
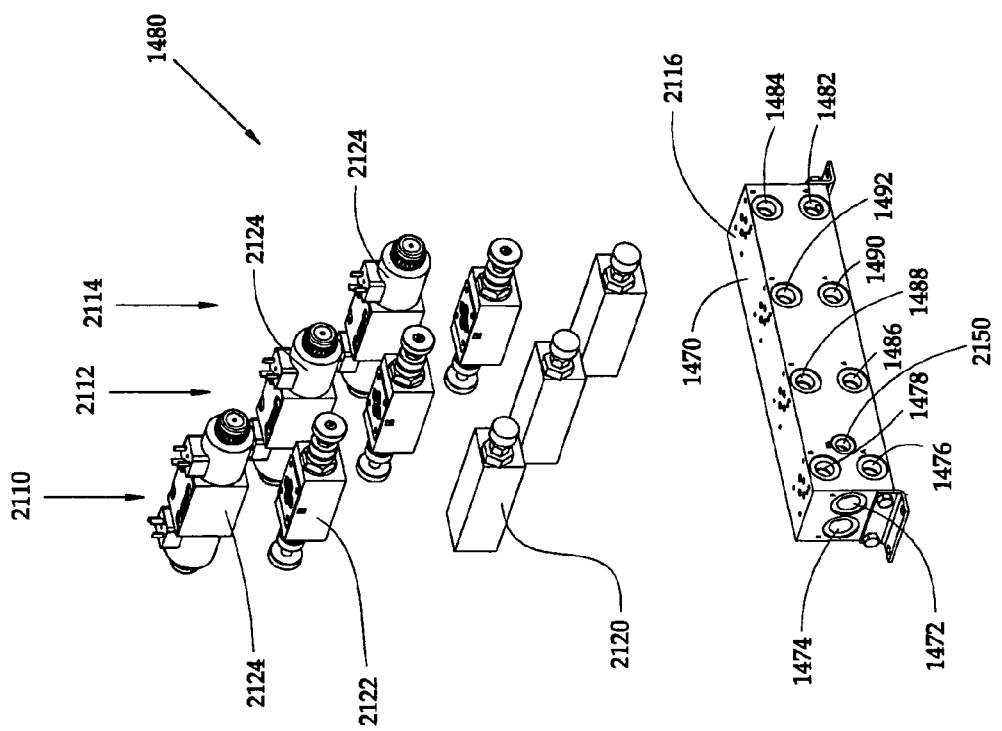
FIG. 21 is a perspective view of exemplary hydraulic manifold and valves of the cutting attachment apparatus 1410 of FIG. 14, in accordance with an embodiment of the invention.
Figure 22:
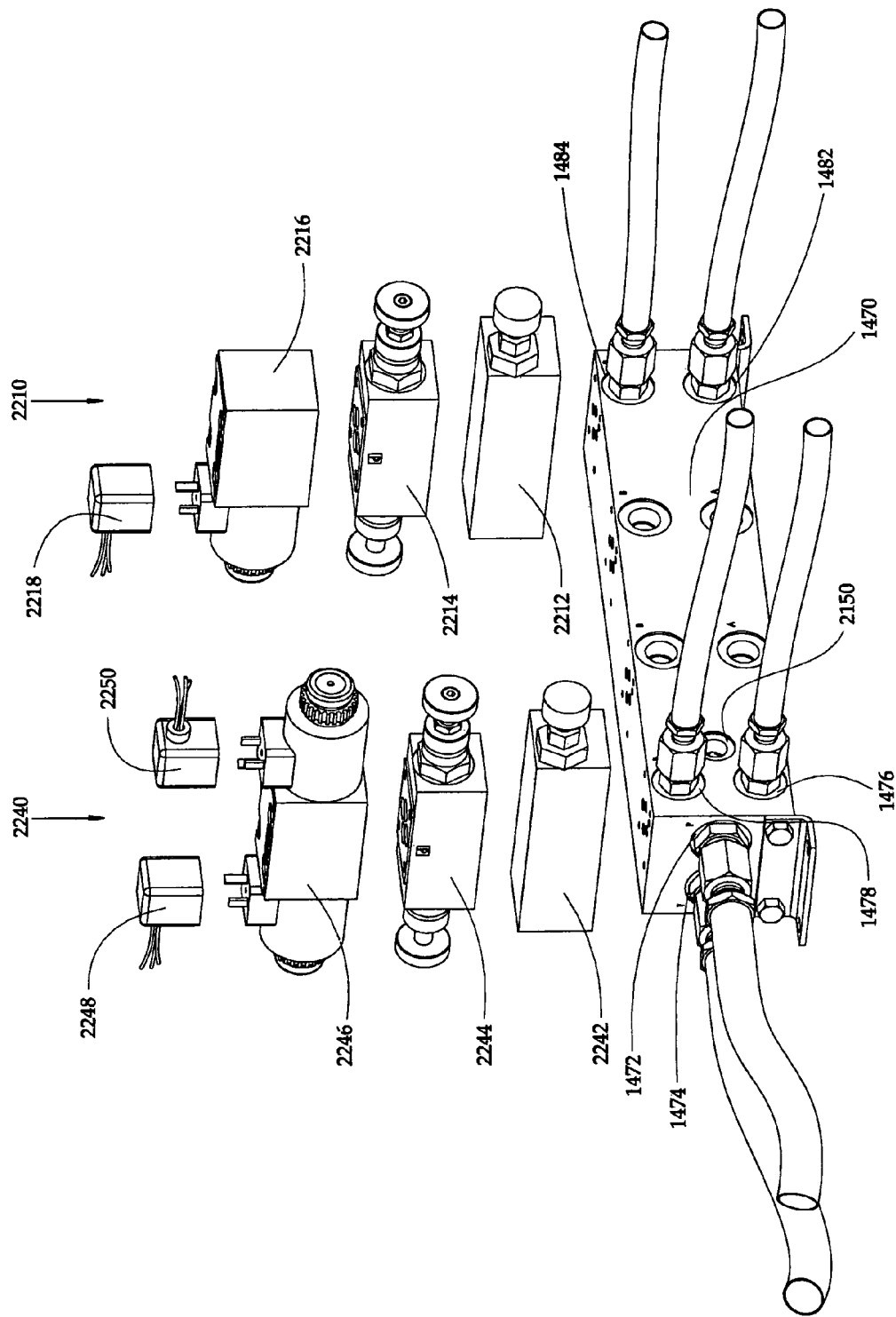
FIG. 22 is an exemplary perspective view illustrating valve sets utilizing two position directional valves and three position directional valves with the hydraulic manifold 1470, in accordance with an embodiment of the invention.

FIG. 21 is a perspective view of exemplary hydraulic manifold and valves of the cutting attachment apparatus 1410 of FIG. 14, in accordance with an embodiment of the invention. FIG. 22 is an exemplary perspective view illustrating general two position directional valve and three position directional valve configuration of the hydraulic manifold and valves of FIG. 2, in accordance with an embodiment of the invention.

As shown in FIG. 21, the plurality of valves 1480 may include one or more stacked valve sets, for example, stacked valve sets 2110, 2112 and 2114. Further, the manifold 1470 may include open locations, for example, as shown at 2116, for additional valve sets to be added in the future for additional hydraulic control of an additional or accessory hydraulic function. Though not shown, plugs may be utilized at open locations.

Each valve set may include a pressure reducing valve, for example the pressure reducing valve 2120 coupled with the manifold 1470, a flow control valve, for example the flow control valve 2122 coupled with the pressure reducing valve 2120, and a directional control valve, for example the directional control valve 2124 coupled with the flow control valve 2122. The manifold 1470 may include a gauge port 2150 where a pressure gauge or test equipment may be coupled with the manifold 1470 to provide information regarding operation of the manifold, or for testing the manifold. Depending on the hydraulic motor being driven, the directional control valve(s) 2124 may be two position or three position valves as will be discussed below. One skilled will realize that in some embodiments, some of the valves, for example, the flow control valve, or the pressure reducing valve, may be left off, for example where such functions are regulated elsewhere, for example, on the cutting assembly 30 or the host vehicle.

Further shown at the manifold are a plurality of supply ports, for example A-ports 1476, 1486, 1490 and 1482, and a plurality of return ports, for example, B-ports 1478, 1488, 1492 and 1484, that supply pressurized hydraulic fluid from the manifold 1470 to a respective hydraulic motor, for example hydraulic motors 31, 1451 and/or 1461. For simplicity purposes, such manifold ports 1476, 1478, 1486, 1488, 1490, 1492, 1482 and 1484 are described as 'supply' or 'return' ports. However, it will be appreciated by one skilled in the art and as will be described in more detail below with reference to FIGS. 21-24, that where a reversible hydraulic motor is coupled with the manifold 1470, either the port A or port B may be a supply port, with the other respective port of that port set being a return port, depending on the direction the hydraulic motor is being operated. The plurality of stacked valves 1480 are further shown in FIG. 21.

More specifically, as shown by example at FIG. 21, a first valve set 2110 may be used in the control of a single direction hydraulic motor, for example, hydraulic motor 31. In this case, the single direction hydraulic motor (not shown in FIG. 21) may be connected to the manifold where the A-port 1476 is connected with a supply port of the motor, and the B-port 1478 is connected with a return port of the motor. The directional control valve of the valve set may be a two position valve, to allow or block hydraulic fluid to the motor.

A second valve set 2112 may be used in the control of a reversible hydraulic motor, for example, hydraulic motor 1451 for controlling insertion depth of a cut. In this case, the reversible hydraulic motor 1451 (not shown in FIG. 21) may be connected to the manifold where the A-port 1486 is connected with a first port of the motor 1451, and the B-port 1488 is connected with a second port of the motor 1451. The directional control valve of the valve set may be a three position valve, to allow hydraulic fluid to enter the hydraulic motor 1451 via the first motor port (i.e., from A-port 1486) to operate the motor in a first direction, to allow hydraulic fluid to enter the hydraulic motor 1451 at the second motor port (i.e., via the B-port 1488) to operate the motor 1451 in an opposite direction. The three position valve may further serve to block hydraulic fluid to the motor 1451. Operation of such a configuration is discussed below with respect to FIG. 22.

A third valve set 2114 may be used in the control of a reversible hydraulic motor, for example, hydraulic motor 1461 for controlling cut angle. In this case, the reversible hydraulic motor 1461 (not shown in FIG. 21) may be connected to the manifold where the A-port 1490 is connected with a first port of the motor 1461, and the B-port 1492 is connected with a second port of the motor 1461. The directional control valve of the valve set may be a three position valve, to allow hydraulic fluid to enter the hydraulic motor 1461 via the first motor port (i.e., from A-port 1490) to operate the motor in a first direction, to allow hydraulic fluid to enter the hydraulic motor 1461 at the second motor port (i.e., via the B-port 1492) to operate the motor 1461 in an opposite direction. The three position valve may further serve to block hydraulic fluid to the motor 1461.

Operation of a valve set including a three position directional control valve to reverse the direction of a reversible hydraulic motor, for example the hydraulic motor 1451 or the hydraulic motor 1461, is discussed below with respect to FIG. 22.

As shown in FIG. 22, two valve sets are shown: a first valve set shown at 2210 utilizing a two position control valve, and a second valve set 2240 utilizing a three position control valve. The first valve set may be coupled with a hydraulic motor that operates in one direction, for example, the cutting assembly hydraulic motor 31, where manifold port 1482 may be a supply port for the hydraulic motor 31, and manifold port 1484 may be a return port from the hydraulic motor 31. The valve set 2210 may include pressure reducing valve 2212 coupled with the manifold 1470, a flow control valve 2214 coupled with the pressure reducing valve 2212, and a two position directional control valve 2216 coupled with the flow control valve 2214. An actuation signal at a connector 2218 actuates the two position valve from a position one that may be, for example, blocked, to a position two that may, for example, allow pressurized hydraulic fluid to flow through the directional valve 2216.

Similarly, the valve set 2240 may include pressure reducing valve 2242 coupled with the manifold 1470, a flow control valve 2244 coupled with the pressure reducing valve 2242, and a three position directional control valve 2246 coupled with the flow control valve 2244. The second valve set may be coupled with a hydraulic motor that has reversible operation, for example, the cut insertion depth actuator hydraulic motor 1451, where manifold A-port 1476 may be coupled with one port of the reversible hydraulic motor 1451, and manifold B-port 1478 may be coupled with the other port of the reversible hydraulic motor 1451. An actuation signal at a connector 2248 actuates the three position valve 2246 from a center blocked first position to a second position allowing pressurized hydraulic fluid to flow through the three position directional valve 2246 to the reversible hydraulic motor 1451 in a first direction, out the A-port 1476, returning via the B-port 1478. When the actuation signal ends, position directional valve 2246 may return to the first blocked position to stop pressurized hydraulic fluid from flowing through the valve.

An actuation signal at a connector 2250 actuates the three position valve 2246 from a center blocked first position to a third position allowing fluid to flow through the three position directional valve 2246 to the reversible motor 1451 in a second direction, out the B-port 1478, and returning via the A-port 1476. When the actuation signal ends, the three position directional valve 2246 may return to the first blocked position to stop pressurized hydraulic fluid from flowing through the valve.

Hydraulic fluid circuits and the pressure reducing, flow control, and two position and three position directional valves mentioned herein are not new to one skilled in the art. As will be appreciated by one skilled in the art, such valves conform to standard National Fluid Power Association (NFPA) design standards, for example, where the valves have several cross drilled ports to move fluid from the pressure supply port feeding the manifold 1472, to the A or B ports 1476, 1478, 1482, 1484 that feed one or more hydraulic motors connected thereto, and from the A or B ports 1476, 1478, 1482 and 1484 back to the return T-port 1474 that returns hydraulic fluid back to the host machine. The spool of the valve is the primary mechanism, that when actuated in one position, the P and A close, and the B and T close, thereby controlling a fluid flow loop. As will further be appreciated by one skilled in the art, the various valves of the stacked valve set 2210 are ported in such a manner that they have extra ports internally to prevent any cross flow, or back flow, thus limiting fluid flow to one direction where necessary.

Further, as will be appreciated by one skilled in the art, the manifold 1470 is manufactured in such manner where the P-port 1472 and T-port 1474 drill through is geometrically located to not interfere or cross the A-ports 1476, 1482, the B-ports 1478, 1484, or the gauge port, for example shown at 2150. A footprint of the various valves is oriented to allow the P-port 1472 and the T-port 1474 to supply, in parallel, each valve set. Each valve set may include internal check valves to prevent back-actuation of another valve set. As is appreciated to one skilled in the art, this is common to all valves that are manifold mounted, conforming to NFPA standards. As shown, the A-ports 1476, 1482 and B-ports 1478, 1484 are oriented 90 degrees with respect to the P-port 1472 and the T-port 1474 in the manifold to permit them to be drilled where they do not cross into one another.

Operation and hydraulic fluid flow will generally be discussed for the valve set shown at 2210, for example, for use with a single direction hydraulic motor such as the hydraulic motor 31. The hydraulic fluid enters the manifold 1470 at the pressure/supply P-port 1472, and is channeled through the manifold 1470 into the pressure reducing valve 2212, where excess pressure is diverted back to the tank/return T-port 1474. The fluid then channels through the flow control valve 2214 to throttle the hydraulic fluid flow, to the two position directional control valve 2216. Where the two position directional control valve 2216 is unactuated, the fluid flow is internally blocked, preventing the flow of hydraulic fluid through the A-port 1482 and from the B-port 1484, thereby preventing operation of the single direction hydraulic motor 31.

Where the two position directional valve 2218 is actuated through a signal at the DIN connector 2218 (i.e., a connector conforming to DIN standards, or, any standard IEEE connection desired, such as any standards with regards to IP65, IP67 for moist/wet environments), the two position directional control valve is actuated to a second position creating a fluid channel through the stacked valve set 2210 between the P-port 1472 and the A-port 1482, and between the B-port 1484 and the T-port 1474. In this way, a fluid path is opened for pressurized hydraulic fluid to flow from the host machine to the single-direction hydraulic motor 31, thereby driving the cutting element connected with the motor 31. Thus, hydraulic fluid enters P-port 1472, channels through the valve set 2210 to the directional control valve 2216, to the A-port 1482, and out to the hydraulic motor 31. The fluid returns from the hydraulic motor 31 via B-port 1484, through the valve set 2210 to the directional control valve 2216, and back to the manifold 1470 and out to the T-port 1474. When the actuation signal at connector 2218 is discontinued, the directional valve 2216 returns to the first position, blocking hydraulic fluid flow, thereby stopping operation of the hydraulic motor 31.

Operation and hydraulic fluid flow will generally be discussed for the valve set shown at 2240, for example, for a reversible hydraulic motor such as the hydraulic motor 1451 and/or 1461. The hydraulic fluid enters the manifold 1470 at the pressure/supply P-port 1472, and is channeled through the manifold 1470 into the pressure reducing valve 2242, where excess pressure is diverted back to the tank/return T-port 1474. The fluid then channels through the flow control valve 2244 to throttle the hydraulic fluid flow, to the three position directional control valve 2246. Where the three position directional control valve 2246 is unactuated, the fluid flow is internally blocked, preventing the flow of hydraulic fluid through the A-port 1476 and from the B-port 1478, thereby preventing operation of the reversible hydraulic motor, for example motor 1451.

Where the three position directional valve 2246 is actuated through a signal at the DIN connector 2248, the three position directional control valve is actuated to a second position creating a fluid channel through the stacked valve set 2240 between the P-port 1472 and out the A-port 1476, and between/from the B-port 1478 to the T-port 1474. Thus, hydraulic fluid enters P-port 1472, channels through the valve set 2240 to the directional control valve 2246, and to the A-Port 1476 to the reversible hydraulic motor 1451. The fluid returns from the hydraulic motor 1451 via B-port 1478, through the valve set 2240 to the directional control valve 2246, and back to the manifold 1470 to the T-port 1474. In this way, a fluid path is opened for pressurized hydraulic fluid to flow from the host machine to the reversible hydraulic motor 1451, thereby driving the hydraulic motor 1451 (and corresponding adjustment assembly, here insertion depth assembly 1450) in a first direction.

Where the three position directional valve 2246 is actuated through a signal at the DIN connector 2250, the three position directional control valve is actuated to a third position where the three position valve 2246 creates a fluid channel through the stacked valve set 2240 between the P-port 1472 and out the B-port 1478, and between/from the A-port 1476 to the T-port 1474. Thus, hydraulic fluid enters P-port 1472, channels through the valve set 2240 to the directional control valve 2246, and to the B-Port 1478 to the hydraulic motor 1451. The fluid returns from the hydraulic motor 1451 via A-port 1476, through the valve set 2240 to the directional control valve 2246, and back to the manifold 1470 to the T-port 1474. In this way, a fluid path is opened for pressurized hydraulic fluid to flow from the host machine to the reversible hydraulic motor 1451, thereby driving the hydraulic motor 1451 (and corresponding adjustment assembly, here insertion depth assembly 1450) in a second direction.

When the actuation signal either the connector 2248 or 2250 is discontinued, the directional valve 2246 returns to the first position, blocking hydraulic fluid flow, thereby stopping operation of the hydraulic motor 1451 in either direction.

Figure 24:
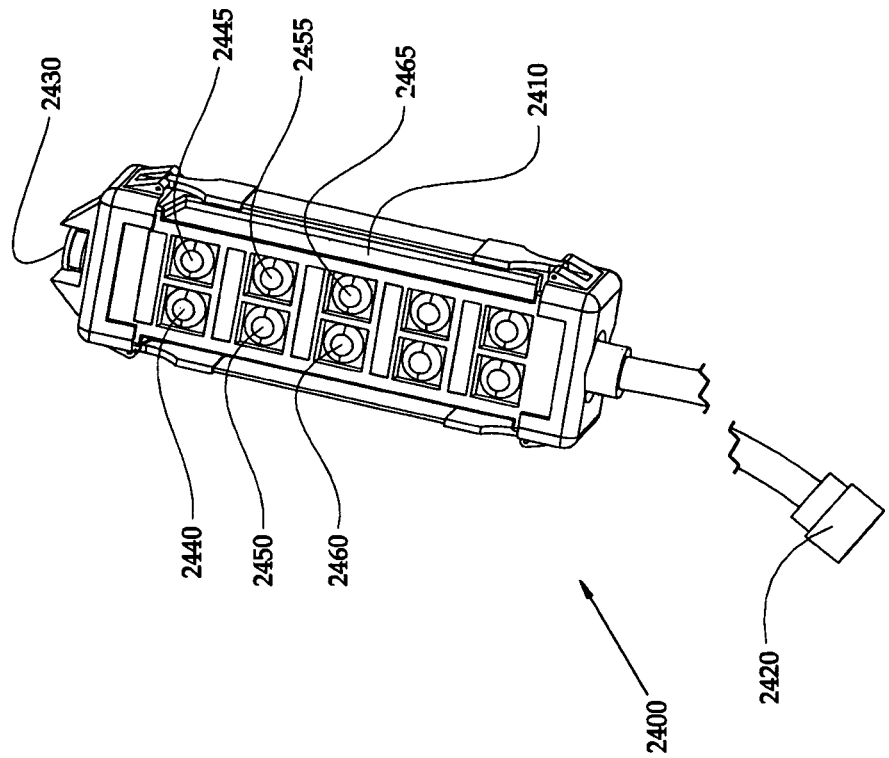
FIG. 24 is a perspective view of a remote operation pendant control for the cutting attachment apparatus 1410 of FIG. 14, in accordance with an embodiment of the invention.
Figure 23:
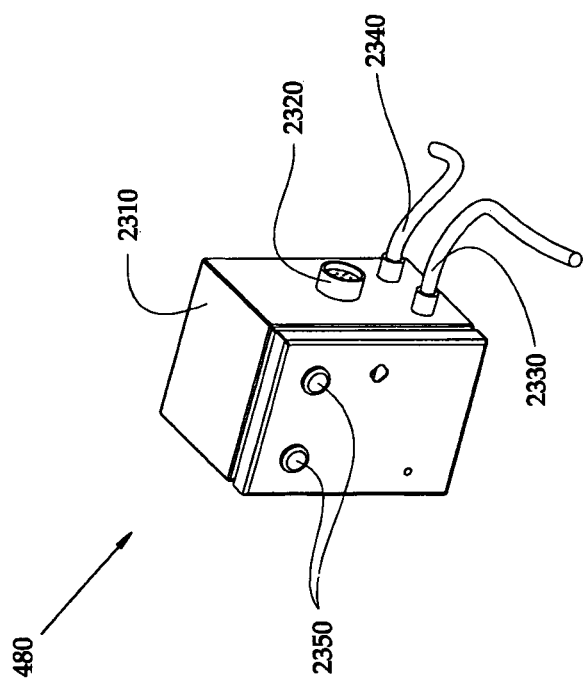
FIG. 23 is a perspective view of an exemplary junction box for remote operation of the cutting attachment apparatus 1410 of FIG. 14, in accordance with an embodiment of the invention.

FIG. 23 is a perspective view of an exemplary junction box 480 used in a remote operation of the cutting attachment apparatus 1410 of FIG. 14, in accordance with an embodiment of the invention. FIG. 24 is a perspective view of a remote operation pendant control 2400 for the cutting attachment apparatus 1410 of FIG. 14 in accordance with an embodiment of the invention.

As shown in FIG. 23, the junction box 480 includes a housing 2310, for example, a National Electrical Manufacturers Association (NEMA) 4X sealed junction box. Such housing may be comprised from any material, for example, steel, fiberglass, plastic, and may be configured for wet and/or dusty areas, in accordance with IEEE standards. The box may include a pendant connector 2320 for accepting a connection with a pendant control, for example, a pendent control 2400 discussed below. Such a connector may be, for example, an IP65 or IP67 rated connector to provide connection for a sufficient number of conductors, with considerations as to, for example, a number of components to be driven and the number of conductors necessary for driving that number of components. The junction box 480 may further be connected with a power source, shown generally shown at 2330, for example a battery of the host machine, or other external battery. The junction box 480 may further be connected with one or more of the various connectors on the directional control valves of the cutting attachment apparatus, 1410 for example, of the valve sets 2110, 2112, and/or 2114, at connection 2340.

The junction box 480 may be equipped with status indicator lights, for example, indicator lights 2350, to report the condition or status of power to the junction box 480, or to the valves located on the manifold block 1470.

FIG. 24 is a perspective view of a controller, for example, a remote operation pendant control for the cutting attachment apparatus 1410 of FIG. 14, in accordance with an embodiment of the invention. As shown in FIG. 24, the pendent represented at 2400 includes a housing 2410 that may be comprised of any material, for example, metal, plastic or fiberglass, and may be sealed from water and dust. A pendent plug 2420 may couple the pendent 2400 with the junction box 480, for example, as a mating plug 2420 to the pendent connector 2320 discussed above. The pendant may include an emergency stop button 2430, cutting power to the cutting attachment apparatus 1410 or any function thereof. Buttons, for example, buttons 2440, 2450, 2455, 2460 and 2465 may be utilized to control various functions of the cutting attachment apparatus 1410. For example, button 2440 may be used to control the cutting element 36 of the cutting attachment 1410, where buttons 2450, 2455 may be used to increase or decrease a cut insertion depth of the cutting element, and where buttons 2460, 2465 may be used to increase or decrease a cut angle of the cutting element 36. An indicator light 2445 may be utilized to indicate cutting element operation. Additional buttons and/or indicators may be provided as desired, for controlling additional functionality of the cutting attachment apparatus 1410.

One skilled will realize that the emergency stop button 2430 may be a normally closed single pole single throw (SPST) pushbutton switch. The button 2440 may be a normally open (NO) SPST push button switch that engages until pushed again. One skilled will realize that push buttons 2450, 2455, 2460, and 2465 may be NO momentary pushbutton switches that only remain engaged while being depressed. Other switch types or switch configurations may be employed.

Figure 25:
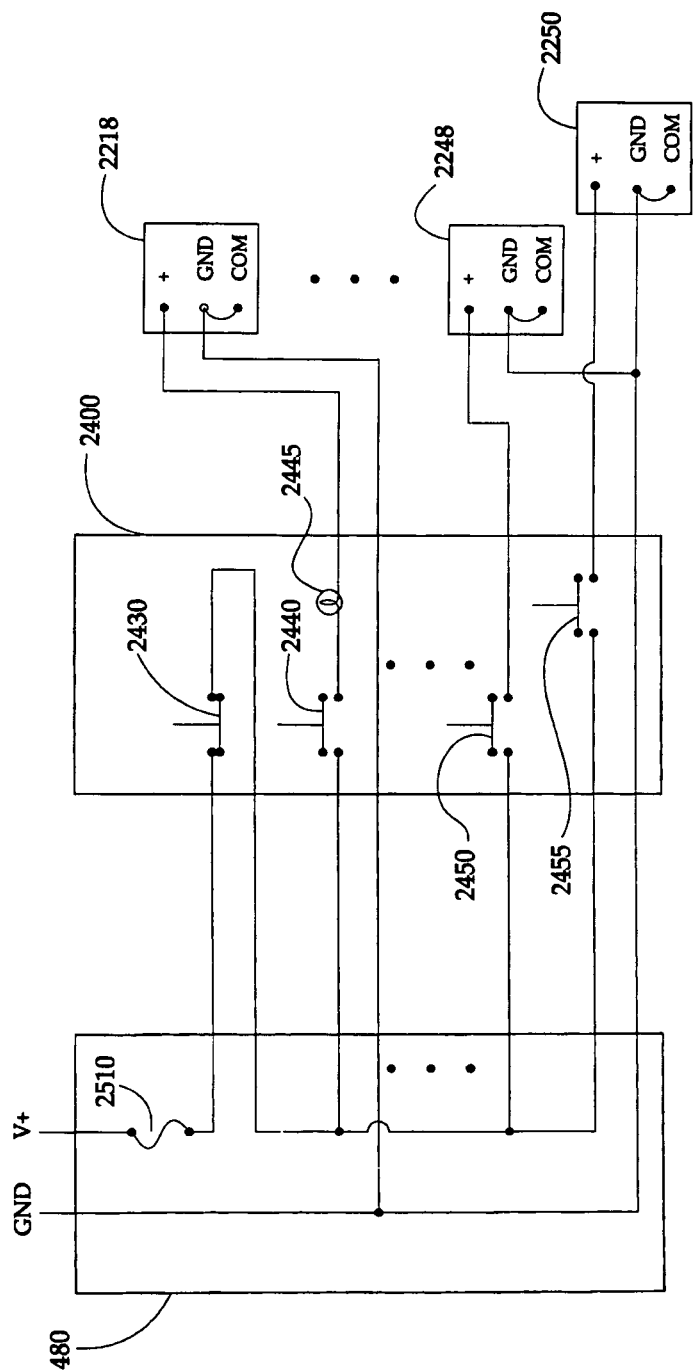
FIG. 25 is a representative basic circuit diagram showing a general remote control circuitry of the cutting attachment apparatus 1410 of FIG. 14, in accordance with an embodiment of the invention.

FIG. 25 is a representative basic circuit diagram showing a general remote control of the cutting attachment apparatus 1410 of FIG. 14, in accordance with an embodiment of the invention. The circuit diagram is representative in that, for simplicity, general representative circuitry for one single-direction motor and one reversible hydraulic motor is shown. Additional circuitry may be employed for controlling additional components, as will be appreciated by one skilled in the art.

As shown in FIG. 25, and referring to FIGS. 21-25, a fuse 2510 may be provided. The fuse rating may be selected based on the voltage requirements on the components being driven, and the current draw of those components. Depressing the emergency stop switch 2430 breaks the electrical circuit, thereby stopping any of the components controlled by the pendent 2400.

Where it is desired to engage the cutting element 36 of the cutting attachment apparatus 1410, the switch 2440 may be engaged, thereby actuating the two position directional control valve 2216 to the second position via connector 2210. Engaging switch 2440 may also activate indicator 2445, for example, a light element, to indicate that the cutting element has been engaged. Engaging switch 2440 an additional time breaks the circuit to the directional control valve 2216, thereby returning the valve back to position 1 to disengage the cutting element 36 of the cutting attachment apparatus 1410.

Where it is desired to engage a reversible hydraulic motor, for example the reversible hydraulic motor 1451 for adjusting the cut insertion depth, of the cutting attachment apparatus 1410, the switch 2450 may be engaged. This actuates the three position directional control valve 2246 to the second position via connector 2248, thereby driving the hydraulic motor 1451 in a first direction to adjust cut insertion depth, for example, increasing cut insertion depth of the cutting element 36. The adjustment will continue while the switch 2450 is depressed. Ending the depression of the switch 2450 will break the circuit to the directional control valve 2246, placing it in the position 1 that blocks hydraulic fluid flow, thereby disengaging the hydraulic motor 1451 of the cut attachment apparatus 1410.

In a similar fashion, the switch 2455 may be engaged. This actuates the three position directional control valve 2246 to the third position via connector 2250, thereby driving the hydraulic motor 1451 in a second direction to adjust cut insertion depth, for example, by decreasing cut insertion depth of the cutting element 36. Thus, the adjustment will continue while the switch 2455 is depressed. Ending the depression of the switch 2455 will break the circuit to the directional control valve 2246, placing it in the position 1 that blocks hydraulic fluid flow, thereby disengaging the hydraulic motor 1451 of the cut attachment apparatus 1410.

One skilled will realize that though the manifold 1470 and valves 1480 have been described as attached with the frame 20, they may instead be provided as an assembly capable of being mounted with the host machine. In this case, it will be appreciated that the length of the various hydraulic hoses between the manifold and the respective hydraulic motors of the cutting attachment apparatus 1410 may be increased.

Thus, cutting attachment apparatus 10 and cutting attachment apparatus 1410 have been described in accordance with embodiments of the invention. Each cutting attachment apparatus is capable of being coupled with a host machine. The insertion depth and the cutting angle of a cut may be adjusted.

Each cutting attachment apparatus may be utilized to perform cuts on materials and objects, for example but not limited to, curbing, driveway aprons, pilings, piers, stanchions, walls, and foundations. As shown in FIGS. 4A and 4C, the cutting attachment may extend over an object being cut, thereby allowing the cutting assembly 30 to perform cuts to objects like curbs from a side of the object away from the host machine, while allowing the host machine to be guided along the street or other surface on the street-side of the curb. Providing a cut from the backside of the curb reduces the chance of damaging the street proximate to the curb.

The raised portion of the frame, for example, shown at A-frame portion 22, allows for angle adjustments of the cutting assembly for cuts within the perimeter of the attachment frame. Where it is desired to reduce the height of a curb near a driveway apron, angling the cut from the backside of the curb allows for such a cut without disturbing the driveway apron. As cuts may be provided from the backside of a curb, the cutting attachment apparatus may accomplish cuts with curbs having a tight inside curb radius. Additionally, as the cutting assembly is reversible, cuts outside a perimeter of the attachment frame may be performed.

Where cuts are desired on structures with limited clearance or operating area, the cutting attachment apparatus 10 and 1410 each allow for such cuts, as the attachment and selected host vehicle may be selected with clearance in mind, to fit within the allotted space. Further, where cuts are to be made on existing structures, the cutting attachment apparatus 10 and 1410, each being lightweight as compared with existing stand alone vehicles, may utilize a relatively small host machine such as a walk-behind skid steer machine, thereby allowing operation on existing structures, or within structures where entry access is limited, for example, where the largest entry is a double door.

In the case where a cut is desired in a location where the desired object being cut is submerged underwater, the cutting attachment apparatus 10 and 1410 may each be employed for such a cut, where the cutting attachment apparatus is attached with a host vehicle Lull, multiple articulating-jointed arm, or telescopic boom. In this case, the Lull, multi-articulated arm or telescopic boom may be extended into the water with the cutting attachment apparatus to accomplish the desired cut, for example, to a pier post or other submerged object. Additionally, in this case, the hydraulic manifold may be removed from the attachment frame and placed at the host machine, the cutting attachment apparatus may be submerged in liquid to accomplish such cuts.

As the cutting attachment apparatus 10 and 1410 may be utilized with walk-behind host machines or towable (via trailer) skid steer loader host machines, the cutting attachment apparatus and host machine may be readily transported to a job site without concerns as to size and weight limitations of road ways, or the necessity of a large flatbed trailer requiring a commercial drivers license to haul. Further, where other operations are required at a job site, the cutting attachment apparatus may be disconnected from the host machine, and replaced with a bucket for digging, a sweeper (i.e., a brush roll sweeper) for sweeping, etc. . . . . Thus, the cutting attachment apparatus along with other desired attachments may be transported to a job site with a single host machine, allowing multiple functions to be performed with the single host machine.

Further, the cutting attachment apparatus used with the host machine may be maneuverable over soft or uneven surfaces such as sand, gravel, soil, grass, while still achieving accurate and precise cuts, as compared with conventional stand-alone cutting vehicles. The host machine tracts, or all-terrain-vehicle capabilities, coupled with the relatively light-weight aspect of the cutting attachment apparatus allow cuts to be performed over such uneven and/or soft surfaces where conventional stand-alone cutting vehicles are unable to accurately and precisely operate.

Though not shown in the drawings, in accordance with another embodiment, the guard 46 may include a garden hose connection to provide water at the cutting element for the purpose of performing a wet cut, and/or reducing dust and airborne debris. Water supply to the cutting attachment apparatus 10 or 1410, may be provided by a mobile tank, integrated water tank (a user supplied accessory, which may be powered or gravity fed), or to a fixed water source. The allocation to the cutting assembly guard accommodates any commercially available bulk head connector to a GHT (garden hose thread) connection.

The motor 31 discussed above may be a hydraulic motor, such a hydraulic motor 31 may be a Parker Series F11 hydraulic motor capable of 40.4 gallons per minute (GPM) hydraulic flow, a max operating revolution per minute (RPM) of 8,100, with a motor displacement of 1.16 cubic inch per revolution, and a maximum horse power (HP) of 116.9, and capable of providing 75.79 foot pounds of torque. Such a motor may include a built-in check valve and flow restrictor, capable of restricting the operation of the motor to 20 gallons per minute (GPM) hydraulic flow, a max operating revolution per minute (RPM) of 2,270, and a maximum horse power (HP) of 19.95, and capable of providing 46.15 foot pounds of torque. Other hydraulic motors may be employed for the cutting element, accounting for the desired cut and/or composition of the object being cut.

The insertion depth adjustment actuator motor 1451 and cut angle adjustment motor 1561 may each be reversible hydraulic motors, for example, a Parker TB series hydraulic motor supplying one hundred (100) foot-lbs of torque and an adjustable rotational speed. Specifications for pressure and flow to the adjustment motors are specific to the type of material being cut, and are specified to a particular application. Other motors may be utilized.

Though not shown, one skilled will realize that electric-type motors may instead be utilized for the cutting element motor and/or he adjustment motors, with a host machine alternator, generator, or other stand alone generator, for example mounted to or towed by the host machine providing the necessary electrical power to drive the electrical motor.

The hydraulic hoses (not shown) for the hydraulic connections, for example, the supply and return hoses, may be % inch diameter Parker Tough Cover hoses, capable of withstanding 3000 psi, such as the Parker 451TC-8 WP21.0 MPa hoses. Standard hydraulic connectors (not shown) such as a male FEM-802-8PF and female—801-8PF may be utilized. A standard drain hose may be provided, for example, to return the case oil of the hydraulic motor, for example, the hydraulic blade motor 31, to the reservoir to eliminate any pressure locks associated with residual drainage of the hydraulic system. Such drain hoses may be, for example, a Parker 901-6 WP 24 MPa, rated at 350 psi. Such drain hose may utilize a standard drain hose connection, for example Male H2-63 and Female H2-62 connectors. Other hydraulic and drain hoses may be utilized.

The host machine may be any host machine capable of controlling the weight and size of the cutting attachment apparatus 10. Such machines may be walk behind machines, for example a Toro Dingo, or drivable machines as any skid-steer loader machine, where the cutting assembly attachment may be mounted at the skid-steer bucket mount.

The cutting element 36 has been disclosed as a blade, for example an aggregate blade. Such a blade may be a Husqvarna blade, item 585050901, Description LYBHP W1120 NWN, that is an aggregate blade capable of cutting concrete, brick, asphalt and the like. Such a blade may have a diameter of 28 inches, with a blade thickness 0.220 inches, and be comprised of pre-stressed, tensioned, steel core, with diamond embedded segments. A blade arbor hole may be 1 inch diameter with a standard pattern of connection holes for coupling with the cutting attachment apparatus. One skilled will realize that other blade diameters may be utilized, for example, having a greater or lesser diameter. For example, a 40 inch diameter blade may be utilized, permitting a cut insertion depth adjustment of up to 18 inches. The frame 20, A-frame portion 22, and/or motors, actuators, and other components of the cutting attachment apparatus may be altered or resized to accommodate blades having other dimensions, as would be appreciated by one skilled in the art.

Though disclosed as an aggregate blade, the cutting element may employ other cuttings means. For example, the cutting element 36 may instead be a steel carbide blade or other blade, capable of sawing wood or brush. In the alternative, a wire cutting element may be utilized, for example, a 10" long stainless steel wire element, mounted to and projecting from a steel hub with 1" diameter arbor, for cutting grass, brush, small trees and bushes or other items. Such a wire may be encrusted with diamond for cutting, for example, posts and bollards.

Though the rods 56, 66 have been described as being threaded screws or rods, however, other retraction or extension techniques of such rods may be employed. For example, such rods may instead be hydraulic cylinders with operating specifications capable of providing the insertion depth or angle adjustments to the cutting assembly. Such cylinders may be controlled from a manifold and pendent controller, for example as discussed herein, or by connected to a Power Take Off (PTO) port of a host machine. Other linear actuators may be utilized.

Exemplary dimensions, weight and other information will now be provided. Referring to FIG. 10, Length 'l' may be 102 inches with width 'w' being 39 inches and the height 'h' being 38 inches. The overall weight of the attachment may be approximately 700 lbs. The weight is dependent on the material construction, materials, and composition of the actuator elements, cutting element, etc. . . . .

The frame 20 proximate the interface 70 may be comprised of steel, for example, ³⁄₁₆ inch up to ½" inch thick, depending on the application. Other materials, for example, non-ferrous metals such as appropriately sized 6061 series aluminum alloys may be utilized. Each leg element of the A-frame 22 at 'fl1', 'fl2', 'fl3' and 'fl4' may be 23.25, 16, 18.5 and 12.5 inches long, respectively. It will be appreciated that each leg element of the A-Frame 22 at "fl1", "fl2", "fl3" and "fl4" are designed with a specific reach, depth adjustment, load, and primary cutting application, and may vary based on any or all of these operational elements.

Each A-frame 22 leg may be comprised of two A-516 PVQ alloy steel plates, for example, having a leg height of six inches. The spacing 'fs' between the steel plates may be two inches. Frame cross members 24 may be comprised of CVN70 or A500 welded steel tubing or applicably sized aluminum extruded tubing having a diameter, wall thickness and length of six inches, % inch, and 14 inches, respectively. Frame cross member 25 may be comprised of CVN70 or A500 welded rectangular steel tubing rectangular steel tubing having a height, width and length of two inches by four inches by 18 inches, respectively. One skilled will realize that other materials may be utilized for construction of the frame, and that the frame dimensions are only exemplary and other dimensions may be utilized while still achieving at least some advantages of the invention.

The adjustment rod 56 may be a threaded ACME rod with a 1"-5 thread, 18 inches long. Adjustment rod 66 may be, for example, a threaded ACME screw, for example, 40 inches long, and having a 1⅛ inch-5 thread. Other screws or threaded rods may be used, having different lengths, diameters and thread per inch, that may be dependent on various dimensions of the frame, while still achieving at least some of the advantages discussed herein.

Using the components and dimensions described herein, angle adjustments of the cutting assembly head 30 (and corresponding cutting element 36) may be from −10 degrees to 90 degrees with respect to level. Further, with the cutting assembly reversed, cuts significantly outside a perimeter of the frame 20 may be accomplished, as well as plunge cuts, horizontal cuts as along a concrete wall or other structure, as well as vertical cuts to a concrete curb, wall or other structure. The blade may cut to a depth of, for example, 10.75 inches, however other cut insertion depths may be achieved with other cutting elements. A cutting rate of 85 linear feet per hour may be achieved, for example, through concrete curb with a thickness of 7 inches. One skilled will realize that hydraulic motors, blades, and other specifications of the attachment may be altered to achieve different cutting rates. Further, the cutting rate may be governed by the material being cut, and/or the composition of the material accounting for composition materials, age, erosion, etc. . . . .

Though remote control pendent was discussed as controlling operation of the cutting attachment apparatus 1410, it will be appreciated that other control mechanisms may be used. Such controls may have corresponding buttons to provide the control of various components of the cutting attachment apparatus described herein. For example, a joy stick may instead be employed. In addition to the control mentioned above, a joy stick may allow performance of two operations at the same time, for example by a diagonal actuation of the joystick handle. Thus, an angle adjustment may be accomplished at the same time as a depth adjustment is being made.

While various embodiments of the disclosure have been described, it will be apparent to those of ordinary skill in the art that many more embodiments and implementations are possible within the scope of the disclosure. Accordingly, the disclosure is not to be restricted except in light of the attached claims and their equivalents.

We claim:

1. A cutting attachment apparatus, comprising:
an attachment frame including an A-frame portion;
a host machine interface coupled with the attachment frame for coupling the cutting attachment apparatus with a host machine;
a cutting assembly pivotally coupled with the attachment frame proximate the A-frame portion, allowing for the cutting assembly to provide a cut along an object within a perimeter of the attachment frame;
a cut insertion depth assembly coupled with the attachment frame and the cutting assembly for altering the insertion depth of the cut of the cutting assembly; and
a cut angle assembly pivotally coupled with the attachment frame and the cutting assembly for altering an angle of the cut of the cutting assembly.

2. The cutting attachment apparatus of claim 1, where
the attachment frame includes at least one fixed rail proximate the A-frame portion, and
the cutting assembly includes at least one corresponding receiving channel for interfacing with the at least one fixed rail, and where
the cut insertion depth assembly moves the cutting assembly with corresponding receiving channel along the at least one fixed rail to alter the insertion depth.

3. The cutting attachment apparatus of claim 2, where
the cut insertion depth assembly includes a cut depth rod having a cut depth rod threaded portion, and
the cutting assembly includes a cut depth mating threaded portion for coupling with the cut depth rod threaded portion, and where
the actuating of the cut insertion depth assembly alters the insertion depth of the cut by rotating the cut depth rod to move the cutting assembly receiving channel along the fixed rail.

4. The cutting attachment apparatus of claim 2, where the cut insertion depth adjustment assembly further includes a cut depth adjustment handle, where actuating the cut depth adjustment handle alters the insertion depth of the cut by moving the cutting assembly receiving channel along the fixed rail.

5. The cutting attachment apparatus of claim 2, where the cut insertion depth assembly further includes a cut insertion depth motor, where actuating the cut insertion depth motor moves the cutting assembly with corresponding receiving channel along the at least one fixed rail to alter the insertion depth of the cut.

6. The A cutting attachment apparatus comprising:
an attachment frame including an A-frame portion;
a host machine interface coupled with the attachment frame for coupling the cutting attachment apparatus with a host machine;
a cutting assembly pivotally coupled with the attachment frame proximate the A-frame portion, allowing for the cutting assembly to accomplish a cut within a perimeter of the attachment frame;
a cut insertion depth assembly coupled with the attachment frame and the cutting assembly for altering the insertion depth of the cut of the cutting assembly; and
a cut angle assembly pivotally coupled with the attachment frame for altering an angle of the cut of the cutting assembly, and including a rotatable female threaded coupling, and a threaded cut angle rod coupled within the female threaded coupling, the cut angle rod further coupled at a coupling point of the cutting assembly,
where the actuating the cut angle assembly alters the angle of the cut by rotating the female threaded coupling to pivot the cutting assembly.

7. The cutting attachment apparatus of claim 6, where the cut angle assembly further includes a cut angle handle, where actuating the cut angle handle alters the angle of the cut by pivoting the cutting assembly.

8. The cutting attachment apparatus of claim 6, where the cut angle assembly further includes a cut angle motor, where actuating the cut angle motor alters the angle of the cut by pivoting the cutting assembly.

9. The cutting attachment apparatus of claim 1, where the cutting assembly includes a cutting assembly motor, a blade adapter coupled with the cutting assembly motor, and a blade coupled with the blade adapter.

10. The cutting attachment apparatus of claim 1, where the cutting assembly includes a cutting assembly hydraulic motor, and further comprising
a hydraulic manifold coupled with the attachment frame, having a host hydraulic port set for receiving and sending pressurized hydraulic fluid between the hydraulic manifold and a host machine, and a cutting assembly hydraulic port set for sending and receiving pressurized hydraulic fluid between the manifold and the cutting assembly hydraulic motor,
where the cutting assembly hydraulic motor is coupled with the cutting assembly hydraulic port set.

11. The cutting attachment apparatus of claim 10, further comprising a two position directional valve coupled between the host hydraulic port set and the cutting assembly port set, for controlling hydraulic fluid flow to the cutting assembly hydraulic motor.

12. The cutting attachment apparatus of claim 11, further comprising a pressure reducing valve coupled with a flow control valve, where the pressure reducing valve and the flow control valve are coupled between the host hydraulic port set and the cutting assembly port set.

13. A cutting attachment apparatus, comprising:
an attachment frame;
a host machine interface coupled with the attachment frame for coupling the cutting attachment apparatus with a host machine;
a hydraulic manifold coupled with the attachment frame, the hydraulic manifold having a host hydraulic port set for receiving and sending pressurized hydraulic fluid between the hydraulic manifold and a host machine, and further including a cutting assembly hydraulic port set, and a cut depth hydraulic port set;
a cutting assembly coupled with the attachment frame for providing a cut to an object, the cutting assembly including a cutting assembly hydraulic motor coupled with the cutting assembly hydraulic port set for sending and receiving pressurized hydraulic fluid between the hydraulic manifold and the cutting assembly hydraulic motor;
a cut insertion depth assembly coupled with the attachment frame and the cutting assembly, the cut insertion depth assembly including a reversible cut depth hydraulic motor coupled with the cut depth hydraulic port set via a three position directional valve having first, second and third positions, for altering the insertion depth of the cut of the cutting assembly; and a cut angle assembly coupled with the attachment frame and the cutting assembly for altering an angle of the cut of the cutting assembly;

where actuating the three position valve to the second position drives the reversible cut depth hydraulic motor in a first direction to increase insertion depth of the cut, and actuating the three position valve to the third position drives the reversible cut depth hydraulic motor in a second direction to decrease insertion depth of the cut.

14. The cutting attachment apparatus of claim 13, further comprising a control apparatus coupled with the three position directional control valve, the control apparatus including at least an insertion depth increase control and an insertion depth decrease control, where actuating the insertion depth increase control actuates the three position directional control valve to the second position, and actuating the insertion depth decrease control actuates the three position directional control valve to the third position.

15. A cutting attachment apparatus, comprising:

an attachment frame;

a host machine interface coupled with the attachment frame for coupling the cutting attachment apparatus with a host machine;

a hydraulic manifold coupled with the attachment frame, the hydraulic manifold having a host hydraulic port set for receiving and sending pressurized hydraulic fluid between the hydraulic manifold and a host machine, and further including a cutting assembly hydraulic port set, and a cut angle hydraulic port set;

a cutting assembly coupled with the attachment frame for providing a cut to an object, the cutting assembly including a cutting assembly hydraulic motor coupled with the cutting assembly hydraulic port set for sending and receiving pressurized hydraulic fluid between the hydraulic manifold and the cutting assembly hydraulic motor;

a cut insertion depth assembly coupled with the attachment frame and the cutting assembly for altering the insertion depth of the cut of the cutting assembly; and a cut angle assembly coupled with the attachment frame and the cutting assembly, the cut angle assembly including a reversible cut angle hydraulic motor coupled with the cut angle hydraulic port set via a three position directional valve having first, second and third positions, for altering the angle of a cut of the cutting assembly;

where actuating the three position valve to the second position drives the reversible cut angle hydraulic motor in a first direction to increase the angle of the cut, and actuating the three position valve to the third position drives the reversible cut depth hydraulic motor in a second direction to decrease the angle of the cut.

16. The cutting attachment apparatus of claim 15, further comprising a control apparatus coupled with the three position directional control valve, the control apparatus including at least an angle increase control and an angle decrease control, where actuating the angle increase control actuates the three position directional control valve to the second position, and actuating the angle decrease control actuates the three position directional control valve to the third position.

17. The cutting attachment apparatus of claim 1, where the cutting attachment apparatus extends over the object, the object has a proximate side adjacent the host machine interface and a distant side away from the host machine interface, and where the cutting assembly coupled with the attachment frame for providing a cut to the object includes the cutting assembly extending past the distant side of the object for providing a cut to the distant side of the object.

18. A method of cutting an object, comprising:

attaching a cutting attachment apparatus to a host machine, the cutting attachment apparatus comprising an attachment frame including an A-frame portion, a host machine interface coupled with the attachment frame for coupling the cutting attachment apparatus with a host machine, a cutting assembly pivotally coupled with the attachment frame proximate the A-frame portion, allowing for the cutting assembly to provide a cut to an object within a perimeter of the attachment frame, a cut insertion depth assembly coupled with the attachment frame and the cutting assembly for altering the insertion depth of the cut of the cutting assembly, and a cut angle assembly pivotally coupled with the attachment frame and further coupled with the cutting assembly for altering an angle of the cut of the cutting assembly, the cut angle assembly including a rotatable female threaded coupling, and a threaded cut angle rod coupled within the female threaded coupling, the cut angle rod further coupled at a coupling point of the cutting assembly, for altering an angle of the cut of the cutting assembly;

adjusting an insertion depth of the cut by actuating the cut depth insertion assembly; and adjusting an angle of the cut by actuating the cut angle adjustment assembly by rotating the female threaded coupling to pivot the cutting assembly.

19. The method of cutting an object of claim 18, where the cutting attachment apparatus extends over the object such that the object has a proximate side adjacent the host machine interface and a distant side away from the host machine interface, and where the cutting assembly extends past the distant side of the object, and further comprising providing a cut to the distant side of the object.

20. A cutting attachment apparatus, comprising:

an attachment frame including an A-frame portion, a first pivot position and a second pivot position each proximate the A-frame portion, and a fixed rail coupled at the first pivot position;

a host machine interface coupled with the attachment frame for coupling the cutting attachment apparatus with a host machine;

a cutting assembly including a receiving channel for coupling with the fixed rail, allowing for the cutting assembly to provide a cut to an object within a perimeter of the attachment frame;

a cut insertion depth assembly coupled with the attachment frame and the cutting assembly for altering the insertion depth of the cut of the cutting assembly; and a cut angle assembly coupled with the attachment frame and the cutting assembly for altering an angle of the cut of the cutting assembly;

where in a first orientation with the fixed rail coupled at the first pivot position, the cutting assembly is oriented for providing the cut to the object within the perimeter of the attachment frame, and in a second orientation with the fixed rail coupled at the second pivot position, the cutting assembly is oriented for providing the cut to the object outside the perimeter of the attachment frame.

* * * * *